United States Patent
Nagahara

(10) Patent No.: US 10,895,717 B2
(45) Date of Patent: Jan. 19, 2021

(54) IMAGING OPTICAL SYSTEM, PROJECTION DISPLAY DEVICE, AND IMAGING APPARATUS

(71) Applicant: FUJIFILM Corporation, Tokyo (JP)

(72) Inventor: Akiko Nagahara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 191 days.

(21) Appl. No.: 16/194,599

(22) Filed: Nov. 19, 2018

(65) Prior Publication Data
US 2019/0162936 A1 May 30, 2019

(30) Foreign Application Priority Data
Nov. 29, 2017 (JP) .................................. 2017-229596

(51) Int. Cl.
G02B 13/00 (2006.01)
H04N 9/31 (2006.01)
G02B 13/16 (2006.01)
H04N 5/225 (2006.01)

(52) U.S. Cl.
CPC ......... *G02B 13/0045* (2013.01); *G02B 13/16* (2013.01); *H04N 5/2254* (2013.01); *H04N 9/3105* (2013.01); *H04N 9/317* (2013.01)

(58) Field of Classification Search
None
See application file for complete search history.

(56) References Cited

U.S. PATENT DOCUMENTS

| | | | |
|---|---|---|---|
| 7,009,765 B2 | 3/2006 | Gohman | |
| 10,539,766 B2 | 1/2020 | Shiokawa et al. | |
| 2010/0290133 A1 | 11/2010 | Sano et al. | |
| 2011/0002046 A1 | 1/2011 | Wada et al. | |

(Continued)

FOREIGN PATENT DOCUMENTS

| | | | |
|---|---|---|---|
| JP | 2010-266577 A | 11/2010 | |
| JP | 2011-013469 A | 1/2011 | |

(Continued)

OTHER PUBLICATIONS

An Office Action; "Notice of Reasons for Refusal," mailed by the Japanese Patent Office dated Oct. 27, 2020, which corresponds to Japanese Patent Application No. 2018-221540 and is related to U.S. Appl. No. 16/194,599 with English language translation.

*Primary Examiner* — Michelle M Iacoletti
*Assistant Examiner* — Danell L Owens
(74) *Attorney, Agent, or Firm* — Studebaker & Brackett PC

(57) ABSTRACT

The imaging optical system consists of, in order from a magnification side: a first optical system which makes a magnification side imaging surface and an intermediate image conjugate to each other; and a second optical system which makes the intermediate image and a reduction side imaging surface conjugate to each other. The imaging optical system is configured to be telecentric on the reduction side. The first optical system includes an aspheric lens. The second optical system consists of a front group and a rear group. The imaging optical system satisfies predetermined conditional expressions for a focal length of the front group, a focal length of the imaging optical system, a focal length of the rear group, a maximum image height, a focal length of the first optical system, and the aspheric lens of the first optical system.

11 Claims, 13 Drawing Sheets

(56) References Cited

U.S. PATENT DOCUMENTS

2011/0032606 A1    2/2011  Imaoka
2015/0077848 A1*   3/2015  Ichimura ............ G02B 27/0062
                                                        359/434

FOREIGN PATENT DOCUMENTS

| JP | 2011-053663 A | 3/2011 |
| JP | 2016-143032 A | 8/2016 |
| JP | 2018-097046 A | 6/2018 |

* cited by examiner

EXAMPLE 1

EXAMPLE 3

EXAMPLE 4

EXAMPLE 5

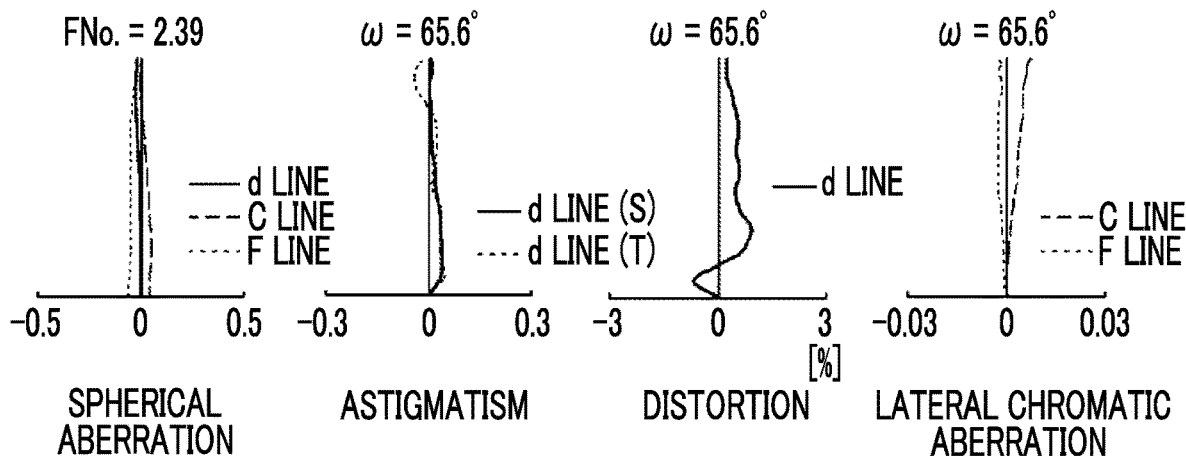
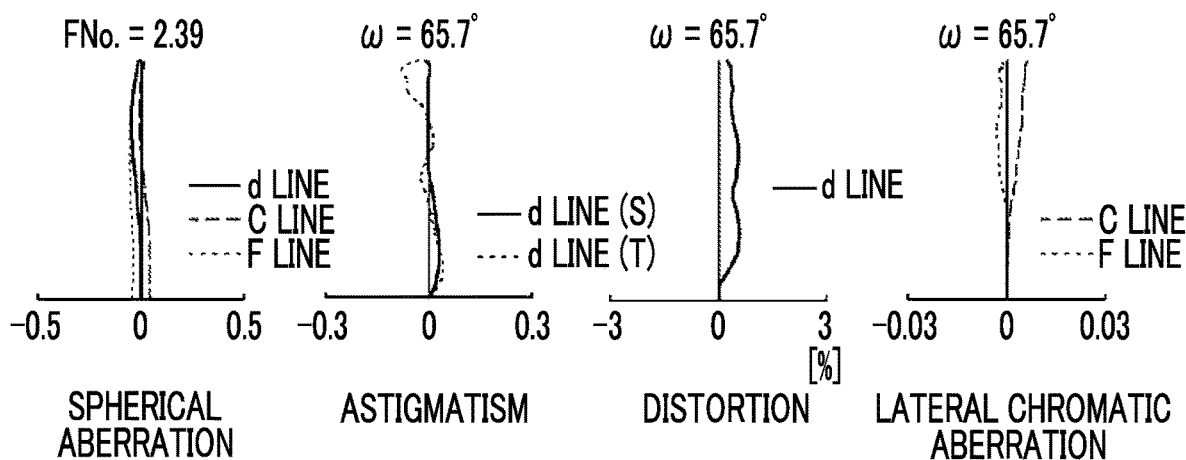

EXAMPLE 3

EXAMPLE 4

EXAMPLE 5

IMAGING OPTICAL SYSTEM, PROJECTION DISPLAY DEVICE, AND IMAGING APPARATUS

CROSS-REFERENCE TO RELATED APPLICATIONS

The present application claims priority under 35 U.S.C. § 119 to Japanese Patent Application No. 2017-229596, filed on Nov. 29, 2017. The above application is hereby expressly incorporated by reference, in its entirety, into the present application.

BACKGROUND OF THE INVENTION

1. Field of the Invention

The present invention relates to an imaging optical system, a projection display device, and an imaging apparatus.

2. Description of the Related Art

In the past, projection display devices, each of which projects an image displayed on a light valve such as a liquid crystal display element or a Digital Micromirror Device (DMD: registered trademark) onto a screen or the like in an enlarged manner, have come into widespread use. In particular, some widely used devices adopt a configuration in which three light valves are used, illumination light beams with three primary colors of red, green, and blue respectively correspond to the light valves, the light beams, which are modulated through the respective light valves, are synthesized through a prism or the like, and an image is displayed onto a screen through an imaging optical system.

In a projection imaging optical system used in combination with a light valve in a projection display device, it has been demanded that aberration correction appropriate for the resolution of the light valve is satisfactorily performed in response to recent improvement in performance of the light valve. Further, there are demands to reduce the size of the projection display device and to perform projection on a large screen at a close distance. In order to meet the demands, there is a demand for an imaging optical system having a small size and a wide angle of view.

As a conventionally known imaging optical system applicable to a projection display device, for example, an optical system described in U.S. Pat. No. 7,009,765A can be mentioned. U.S. Pat. No. 7,009,765A describes an optical system in which an intermediate image is formed by a reduction side optical system consisting of a plurality of lenses and an intermediate image is projected in an enlarged manner by a magnification side optical system consisting of a plurality of lenses.

SUMMARY OF THE INVENTION

In recent years, there has been a demand for a projection display device with a higher luminance. For this purpose, an imaging optical system with a small F number is required. Further, in the imaging optical system used for a projection display device of a type in which each modulated light from three light valves is synthesized and projected by a color synthesizing optical system, a long back focal length is required in order for a color synthesizing prism to be disposed therein.

However, the optical system described in U.S. Pat. No. 7,009,765A is not a system having a small F number, and it can not be said that the back focal length is sufficiently long.

The present invention has been made in consideration of the above-mentioned situations, and an object of the present invention is to provide an imaging optical system, a projection display device comprising the imaging optical system, and an imaging apparatus comprising the imaging optical system. The imaging optical system has a small F number, a sufficient back focal length ensured, and a favorable optical performance.

In order to meet the above demands, an imaging optical system of the present invention consists of, in order from a magnification side to a reduction side: a first optical system which makes a magnification side imaging surface and an intermediate image conjugate to each other; and a second optical system which makes the intermediate image and a reduction side imaging surface conjugate to each other. The imaging optical system is configured to be telecentric on the reduction side. The first optical system includes at least one aspheric lens. Assuming that a focal length of the whole system is f, a ray, which is incident from the reduction side imaging surface to the second optical system in parallel with an optical axis at a height of $|f|$ from the optical axis, has an intersection point with the optical axis in the second optical system. The second optical system consists of, in order from the magnification side to the reduction side, a front group on the magnification side from the intersection point and a rear group on the reduction side from the intersection point. In addition, it is assumed that a focal length of the front group is fG2A, a focal length of the rear group is fG2B, a maximum image height on the reduction side imaging surface is Y max, a focal length of the first optical system is fG1, a focal length of the aspheric lens included in the first optical system is fas, a refractive index of the aspheric lens at the d line is Nas, and a minimum value of |fas×Nas| is min|fas×Nas|.

$$10.5 < fG2A/|f| < 15 \quad (1)$$

$$3 < fG2B/Y\max < 5.5 \quad (2)$$

$$2.1 < |Y\max/f| < 2.7 \quad (3)$$

$$0.65 < |f|/fG1 < 1 \quad (4)$$

$$7.5 < \min|fas \times Nas|/|f| < 23 \quad (5)$$

Then, Conditional Expressions (1), (2), (3), (4), and (5) are satisfied.

In the imaging optical system of the present invention, it is preferable to further satisfy at least one of Conditional Expressions (1-1), (2-1), (3-1), and (4-1).

$$11 < fG2A/|f| < 14 \quad (1-1)$$

$$3.5 < fG2B/Y\max < 5 \quad (2-1)$$

$$2.1 < |Y\max/f| < 2.4 \quad (3-1)$$

$$0.7 < |f|/fG1 < 0.9 \quad (4-1)$$

Further, in the imaging optical system of the present invention, assuming that a focal length of the front group is fG2A, a focal length of the whole system is f, a maximum image height on the reduction side imaging surface is Y max, and a focal length of the rear group is fG2B, it is preferable to satisfy Conditional Expression (6).

$$2 < (fG2A/|f|) \times (Y\max/fG2B) < 3.5 \quad (6)$$

Further, in the imaging optical system of the present invention, it is preferable to satisfy Conditional Expression (7) for all aspheric lenses included in the first optical system.

$$1.45 < Nas < 1.6 \tag{7}$$

Further, in the imaging optical system of the present invention, assuming that a focal length of the front group is fG2A and a focal length of the rear group is fG2B, it is preferable to satisfy Conditional Expression (8).

$$1 < fG2A/fG2B < 1.55 \tag{8}$$

Further, in the imaging optical system of the present invention, it is preferable that a lens closest to the magnification side in the second optical system has a positive refractive power.

A projection display device of the present invention comprises: a light valve from which an optical image is output based on image data; and the imaging optical system of the present invention. The imaging optical system projects the optical image, which is output from the light valve, onto a screen.

An imaging apparatus of the present invention comprises the imaging optical system of the present invention.

In a case where the imaging optical system of the present invention is applied to a projection display device, the "magnification side" means a projection target side (screen side), and the "reduction side" means an original image display region side (light valve side). Further, in the present specification, it is assumed that the magnification side is the front side, and the reduction side is the back side. For example, a back focal length means a distance on the optical axis from the lens surface closest to the reduction side to the focal position on the reduction side.

In the present specification, it should be noted that the terms "consisting of ~" and "consists of ~" may include not only the above-mentioned elements but also lenses substantially having no refractive powers, optical elements, which are not lenses, such as a stop, a filter, and a cover glass.

The sign of the refractive power in the present specification is to be considered in terms of the paraxial region unless otherwise noted. The above "whole system" means an imaging optical system. Further, the values of the symbols used in the above conditional expressions are values in a case where the distance from the magnification side imaging surface to the lens surface closest to the magnification side is set to be infinite and the d line (a wavelength of 587.6 nm (nanometers)) is set as a reference.

According to the present invention, it is possible to provide an imaging optical system, a projection display device comprising the imaging optical system, and an imaging apparatus comprising the imaging optical system. The imaging optical system has a small F number, a sufficient back focal length ensured, and a favorable optical performance.

BRIEF DESCRIPTION OF THE DRAWINGS

FIG. 7 is a diagram of aberrations of the imaging optical system of Example 1 of the present invention.

FIG. 8 is a diagram of aberrations of the imaging optical system of Example 2 of the present invention.

DESCRIPTION OF THE PREFERRED EMBODIMENTS

Figure 1:
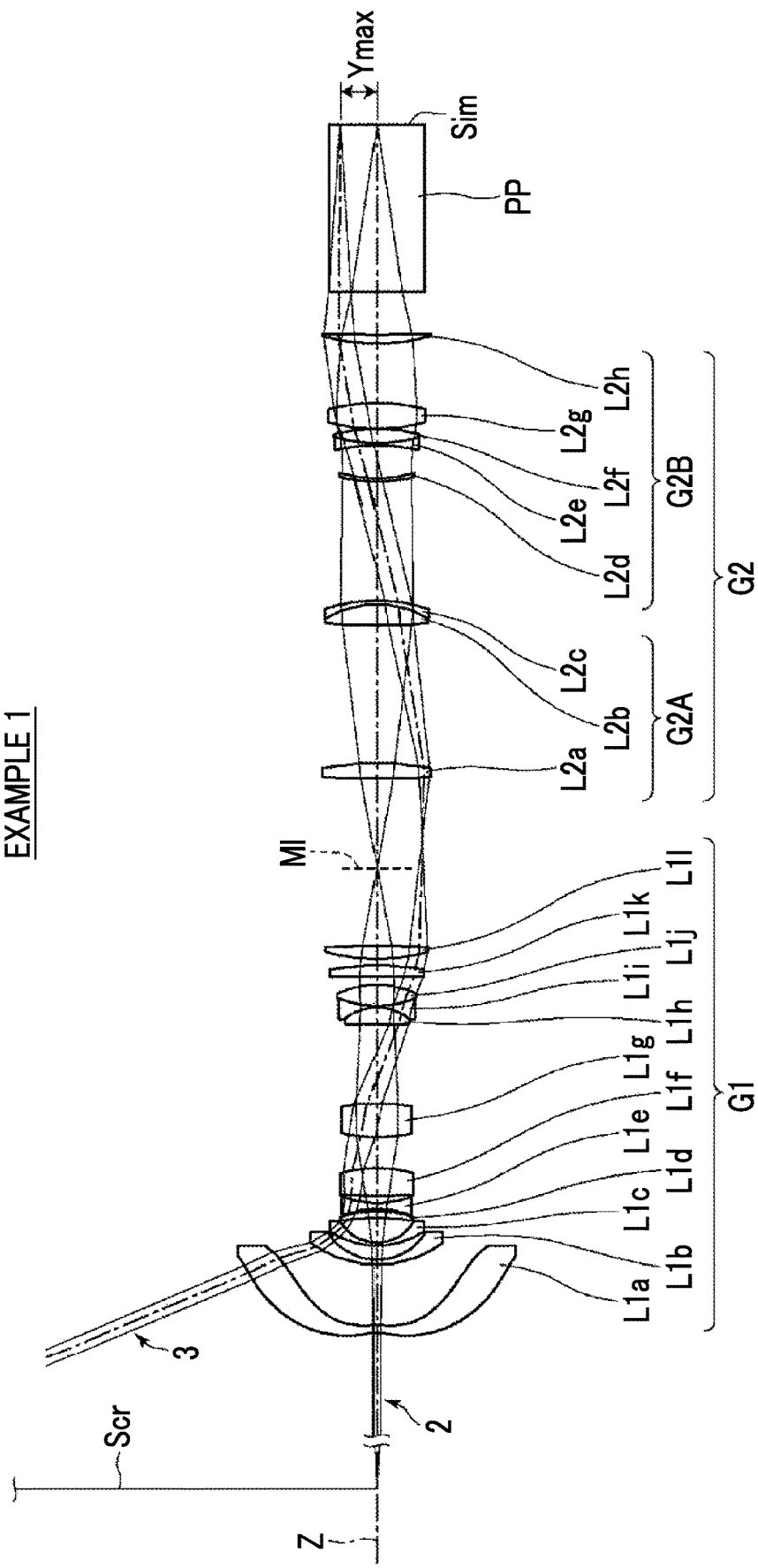
FIG. 1 is a cross-sectional view illustrating a configuration and rays of an imaging optical system (imaging optical system of Example 1 of the present invention) according to an embodiment of the present invention.

Hereinafter, embodiments of the present invention will be described in detail with reference to the drawings. FIG. 1 is a cross-sectional view illustrating a configuration of an imaging optical system according to an embodiment of the present invention. The exemplary configuration shown in FIG. 1 corresponds to Example 1 to be described later. In FIG. 1, the left side is the magnification side, and the right side is the reduction side, and on-axis rays 2 and rays with the maximum image height 3 are also shown.

The imaging optical system of the present embodiment consists of, in order from the magnification side to the reduction side, a first optical system G1 which includes at least one lens and which makes the magnification side imaging surface and the intermediate image MI conjugate to each other, and a second optical system G2 which includes at least one lens and which makes the intermediate image MI and the reduction side imaging surface conjugate to each other. In the example of FIG. 1, the first optical system G1 consists of twelve lenses L1a to L1l in order from the magnification side to the reduction side, and the second optical system G2 consists of eight lenses L2a to L2h in order from the magnification side to the reduction side. However, the first optical system G1 and the second optical system G2 of the present invention may be composed of lenses different in number from that of the example shown in FIG. 1.

The imaging optical system of the present embodiment can be used as a projection optical system mounted on a projection display device and can also be used as an image capturing optical system mounted on a digital camera or the like. In the following description, mainly description will be given on the assumption that the imaging optical system of the present embodiment is used as a projection optical system.

In FIG. 1, assuming that the imaging optical system of the present embodiment is mounted on the projection display device, a screen Scr, an optical member PP, and an image display surface Sim of a light valve are also illustrated. The optical member PP is a member whose incident surface and exit surface are parallel. The optical member PP is a member such as a filter, a cover glass or a color synthesizing prism. The optical member PP is not an indispensable component, and the optical member PP may be configured to be omitted. It should be noted that FIG. 1 shows a configuration example in which a position of a reduction side surface of the optical member PP coincides with a position of the image display surface Sim, but such a configuration in which the positions are different may be possible.

In the projection display device, rays, which are made to have image information through the image display surface Sim, are incident into the imaging optical system through the optical member PP, and are projected onto a screen Scr through the imaging optical system. That is, in the example of FIG. 1, the image display surface Sim corresponds to the reduction side imaging surface, and the screen Scr corresponds to the magnification side imaging surface.

In the configuration example of FIG. 1, the second optical system G2 forms an intermediate image MI at a position conjugate to a reduction side imaging surface, and the first optical system G1 re-forms the intermediate image MI on a magnification side imaging surface. The imaging optical system consists of the first optical system G1, which is disposed on the magnification side, and the second optical system G2, which is disposed on the reduction side, with a forming position of the intermediate image MI interposed therebetween. In addition, in FIG. 1, only a part of the intermediate image MI including the vicinity of the optical axis is conceptually indicated by the dotted line, and the position thereof in the direction of the optical axis is shown on the basis of the position in the vicinity of the optical axis. In the imaging optical system that forms the intermediate image MI, it is possible to reduce a back focal length of the first optical system G1. Therefore, it is possible to reduce a lens diameter of the first optical system G1 on the magnification side. As a result, the system can be configured to be appropriate for achieving an increase in angle of view by reducing the focal length of the whole system.

Further, the imaging optical system of the present embodiment is configured to be telecentric on the reduction side. The color synthesizing prism disposed between the imaging optical system and the light valve has a spectral characteristic which varies depending on the angle of incident light. It is desirable that the imaging optical system used together with such a member having incident angle dependency is configured to be telecentric on the reduction side.

In addition, the term "telecentric on the reduction side" indicates a state where the bisector of a maximum ray on the upper side and a maximum ray on the lower side is substantially parallel to an optical axis Z in the cross section of the rays converging on an optional point of the image display surface Sim which is the reduction side imaging surface, as the rays are viewed from the magnification side to the reduction side. The substantially parallel state described herein is in a state in which the inclination of the bisector with respect to the optical axis Z is in the range of −3° to +3°.

Figure 2:
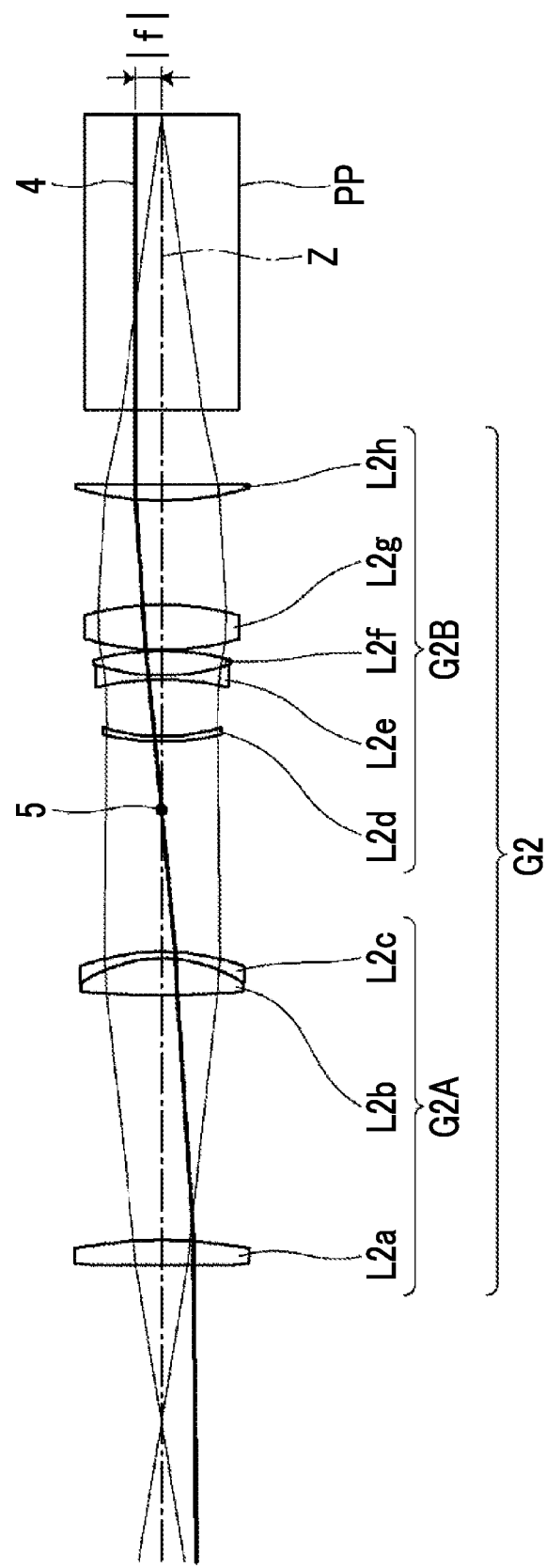
FIG. 2 is a diagram for explaining a front group and a rear group.

Further, assuming that the focal length of the whole system is f, the imaging optical system of the present embodiment is configured such that, as shown in FIG. 2, a ray 4, which is incident at the height of |f| from the optical axis in parallel to the optical axis Z from the reduction side imaging surface to the second optical system G2, intersects the optical axis Z in the second optical system G2. FIG. 2 is a diagram illustrating the second optical system G2 and the optical member PP in the example shown in FIG. 1. As an example, FIG. 2 shows an intersection point 5 between the ray 4 and the optical axis Z. It can be considered that the second optical system G2 is divided into two groups with an intersection point 5 as a boundary. In other words, it can be considered that the second optical system G2 consists of a front group G2A on the magnification side from the intersection point 5 and a rear group G2B on the reduction side from the intersection point 5 in order from the magnification side to the reduction side. In the example shown in FIG. 1, the front group G2A consists of three lenses L2a to L2c, and the rear group G2B consists of five lenses L2d to L2h.

Assuming that a focal length of the front group G2A is fG2A and a focal length of the whole system is f, the imaging optical system of the present embodiment is configured to satisfy Conditional Expression (1).

$$10.5 < fG2A/|f| < 15 \quad (1)$$

In the application as shown in FIG. 1, the second optical system G2 functions as a relay optical system. By not allowing the result of Conditional Expression (1) to be equal to or less than the lower limit, the relay magnification is prevented from becoming excessively small. Thus, it is possible to reduce the loads of the magnification and the performance of the first optical system G1 while ensuring the projection magnification of the whole system. Therefore, it becomes easy to obtain favorable performance in the whole system. As a result, there is an advantage in realizing a small F number. If the relay magnification becomes excessively small, in a case where the projection magnification of the whole system is intended to be ensured, it is necessary to make the enlargement magnification of the first optical system G1 larger. Then, it becomes difficult to correct aberrations of a portion of the first optical system G1, and it is also difficult to cancel aberrations generated in the second optical system G2 and aberrations generated in the first optical system G1. Therefore, it becomes difficult to satisfactorily correct aberrations of the whole system. Further, by not allowing the result of Conditional Expression (1) to be equal to or less than the lower limit, it becomes easy to ensure the angle of view required for the projection optical system while keeping the relay magnification within an appropriate range.

By not allowing the result of Conditional Expression (1) to be equal to or greater than the upper limit, the length of the front group G2A in the direction of the optical axis is prevented from becoming excessively long. Thus, it becomes easy to suppress the increase in total length of the second optical system G2 and suppress the increase in diameter of the magnification side lens of the second optical system G2. Thereby, it is possible to suppress the increase in size of the second optical system G2 without increasing the load of aberration correction performed by the first optical system G1. As a result, it is possible to satisfactorily correct aberrations. In particular, it is possible to correct distortion and field curvature.

Further, in a case of a configuration in which Conditional Expression (1-1) is satisfied, it is possible to obtain more favorable characteristics.

$$11 < fG2A/|f| < 14 \quad (1-1)$$

Further, assuming that a focal length of the rear group G2B is fG2B and a maximum image height on the reduction side imaging surface is Y max, the imaging optical system of the present embodiment satisfies Conditional Expression (2). In addition, in a system where the center of the image circle is on the optical axis Z, Y max corresponds to the radius of the image circle.

$$3 < fG2B/Y\max < 5.5 \quad (2)$$

By not allowing the result of Conditional Expression (2) to be equal to or less than the lower limit, the angle formed between the off-axis ray on the reduction side of the front group G2A and the optical axis Z can be minimized Thus, the increase in diameter of the lens of the front group G2A can be suppressed. Thereby, it becomes easy to lengthen the back focal length of the whole system while minimizing the lens diameter. By not allowing the result of Conditional Expression (2) to be equal to or greater than the upper limit, it is possible to suppress the increase in total length of the second optical system G2.

Further, in a case of a configuration in which Conditional Expression (2-1) is satisfied, it is possible to obtain more favorable characteristics.

$$3.5 < fG2B/Y\max < 5 \quad (2\text{-}1)$$

Further, assuming that a maximum image height on the reduction side imaging surface is Y max and a focal length of the whole system is f, the imaging optical system of the present embodiment satisfies Conditional Expression (3).

$$2.1 < |Y\max/f| < 2.7 \quad (3)$$

By not allowing the result of Conditional Expression (3) to be equal to or less than the lower limit, it becomes easy to suppress distortion and maintain a wide angle of view. By not allowing the result of Conditional Expression (3) to be equal to or greater than the upper limit, it becomes easy to correct aberrations while suppressing the increase in diameter of the lens of the first optical system G1.

Further, in a case of a configuration in which Conditional Expression (3-1) is satisfied, it is possible to obtain more favorable characteristics.

$$2.1 < |Y\max/f| < 2.4 \quad (3\text{-}1)$$

Further, assuming that a focal length of the whole system is f and a focal length of the first optical system G1 is fG1, the imaging optical system of the present embodiment satisfies Conditional Expression (4).

$$0.65 < |f/fG1| < 1 \quad (4)$$

By not allowing the result of Conditional Expression (4) to be equal to or less than the lower limit, it is possible to minimize the enlargement magnification of the first optical system G1. Thus, it becomes easy to correct aberrations such as lateral chromatic aberration to a predetermined amount. By not allowing the result of Conditional Expression (4) to be equal to or greater than the upper limit, it becomes easy to make the diameter of the reduction side lens of the first optical system G1 smaller than the diameter of the magnification side lens of the second optical system G2. Thereby, even in a configuration where the F number is small and the optical system has a wide angle of view, it becomes easy to reduce the overall lens diameter.

Further, in a case of a configuration in which Conditional Expression (4-1) is satisfied, it is possible to obtain more favorable characteristics.

$$0.7 < |f/fG1| < 0.9 \quad (4\text{-}1)$$

The first optical system G1 is configured to include at least one aspheric lens. Since the system includes an aspheric lens, there are advantages in achieving a small F number, achieving an increase in angle of view, and satisfactorily correcting aberrations. Particularly in an optical system having a wide angle of view, the configuration has a great advantage in correcting distortion. Assuming that a focal length of the aspheric lens included in the first optical system G1 is fas, a refractive index of the aspheric lens at the d line is Nas, a minimum value of |fas×Nas| is min|fas×Nas|, and a focal length of the whole system is f, the imaging optical system satisfies Conditional Expression (5).

$$7.5 < \min|fas \times Nas|/|f| < 23 \quad (5)$$

By not allowing the result of Conditional Expression (5) to be equal to or less than the lower limit, it is possible to suppress an increase in thickness difference of the aspheric lens. As a result, it is possible to improve workability. Here, the term "thickness" means the thickness in the direction of the optical axis, and the difference in thickness means the difference between the maximum thickness and the minimum thickness of one lens. By not allowing the result of Conditional Expression (5) to be equal to or greater than the upper limit, the refractive power of the aspheric lens can be ensured. Therefore, the refractive power distributed to the other lens does not become excessive. Thus, it becomes easy to correct aberrations. Further, there is an advantage in suppressing the increase in total length.

Further, assuming that a focal length of the front group G2A is fG2A, a focal length of the whole system is f, a maximum image height on the reduction side imaging surface is Y max, and a focal length of the rear group G2B is fG2B, it is preferable that the imaging optical system satisfies Conditional Expression (6).

$$2 < (fG2A/|f|) \times (Y\max/fG2B) < 3.5 \quad (6)$$

By not allowing the result of Conditional Expression (6) to be equal to or less than the lower limit, it is possible to reduce the load of aberration correction performed by the first optical system G1 while suppressing the increase in total length of the second optical system G2. As a result, it is possible to satisfactorily correct aberrations, and particularly, it is possible to correct distortion and field curvature. By not allowing the result of Conditional Expression (6) to be equal to or greater than the upper limit, it is possible to reduce the load of aberration correction performed by the first optical system G1 while suppressing the increase in diameter of the magnification side lens of the second optical system G2. As a result, it is possible to satisfactorily correct aberrations, and particularly, it is possible to correct distortion and field curvature.

Further, assuming that a refractive index of each aspheric lens of the first optical system G1 at the d line is Nas, it is preferable that each aspheric lens included in the first optical system G1 of the imaging optical system satisfies Conditional Expression (7).

$$1.45 < Nas < 1.6 \quad (7)$$

By not allowing the result of Conditional Expression (7) to be equal to or less than the lower limit, it is possible to suppress an increase in thickness difference of the aspheric lens. As a result, it is possible to improve workability. Further, since the refractive power distributed to the other lenses does not become excessive, it becomes easy to correct aberrations. Furthermore, there is an advantage in suppressing the increase in total length. By not allowing the result of Conditional Expression (7) to be equal to or greater than the upper limit, an inexpensive processing method can be selected, and thus cost reduction can be achieved.

Further, assuming that a focal length of the front group G2A is fG2A and a focal length of the rear group G2B is fG2B, it is preferable that the imaging optical system satisfies Conditional Expression (8).

$$1<fG2A/fG2B<1.55 \quad (8)$$

By not allowing the result of Conditional Expression (8) to be equal to or less than the lower limit, the relay magnification is prevented from becoming excessively small. Thus, it is possible to reduce the loads of the magnification and the performance of the first optical system G1 while ensuring the projection magnification of the whole system. Therefore, it becomes easy to obtain favorable performance in the whole system. If the relay magnification becomes excessively small, in a case where the projection magnification of the whole system is intended to be ensured, as described in the explanation concerning the lower limit of Conditional Expression (1), it becomes difficult to correct aberrations in the first optical system G1. As a result, it becomes difficult to ensure favorable performance of the whole system. Further, by not allowing the result of Conditional Expression (8) to be equal to or less than the lower limit, it becomes easy to ensure the angle of view required for the projection optical system while keeping the relay magnification within an appropriate range.

By not allowing the result of Conditional Expression (8) to be equal to or greater than the upper limit, the length of the front group G2A in the direction of the optical axis is prevented from becoming excessively long. Thus, it becomes easy to suppress the increase in the total length of the second optical system G2 and suppress the increase in diameter of the magnification side lens of the second optical system G2. Thereby, it is possible to suppress the increase in size of the second optical system G2 without increasing the load of aberration correction performed by the first optical system G1. As a result, it is possible to satisfactorily correct aberrations. In particular, it is possible to correct distortion and field curvature.

In the imaging optical system according to the embodiment of the present invention, it is preferable that a lens closest to the magnification side in the second optical system G2 has a positive refractive power. Since the positive lens is disposed to be closest to the magnification side in the second optical system G2, it becomes easy to reduce the outer diameter of the second optical system G2.

The above-mentioned preferred configurations and available configurations may be optional combinations, and it is preferable to selectively adopt the configurations in accordance with required specification. According to the present embodiment, it is possible to realize an imaging optical system having a small F number, a sufficient back focal length ensured, and a favorable optical performance. "Small F number" described herein means an F number of 3.0 or less. Further, the "sufficient back focal length" as described herein means that assuming that a back focal length of the whole system at the air conversion distance is Bf and a maximum image height on the reduction side imaging surface is Y max, "Bf/Y max" is equal to or greater than 1.35. It is more preferable that "Bf/Y max" is equal to or greater than 3.0.

Next, numerical examples of the imaging optical system of the present invention will be described.

EXAMPLE 1

FIG. 1 is a cross-sectional view of the lens configuration and rays of an imaging optical system of Example 1, and a configuration and an illustration method thereof are as described above. Therefore, repeated descriptions are partially omitted herein. The imaging optical system of Example 1 consists of, in order from the magnification side to the reduction side: a first optical system G1 that has a positive refractive power; and a second optical system G2 that has a positive refractive power. The first optical system G1 consists of twelve lenses L1a to L1l in order from the magnification side to the reduction side. The second optical system G2 consists of a front group G2A and a rear group G2B in order from the magnification side to the reduction side. The front group G2A consists of three lenses L2a to L2c in order from the magnification side to the reduction side. The rear group G2B consists of five lenses L2d to L2h in order from the magnification side to the reduction side. The aspheric lens included in the first optical system G1 is the lens L1a.

Table 1 shows basic lens data of the imaging optical system of Example 1, Table 2 shows specification and variable surface distances, and Table 3 shows aspheric surface coefficients thereof. In Table 1, the column of Sn shows surface numbers. The surface closest to the magnification side is the first surface, and the surface numbers increase one by one toward the reduction side. The column of R shows radii of curvature of the respective surfaces. The column of D shows surface distances on the optical axis between the respective surfaces and the surfaces adjacent to the reduction side. Further, the column of Nd shows refractive indexes of the respective components at the d line (a wavelength of 587.6 nm (nanometers)), and the column of νd shows Abbe numbers of the respective components at the d line.

In Table 1, the sign of the radius of curvature of the surface convex toward the magnification side is positive and the sign of the radius of curvature of the surface convex toward the reduction side is negative. Table 1 additionally shows the optical member PP. The value at the bottom place of D in Table 1 indicates a distance between the surface closest to the reduction side and the image display surface Sim in the table. In Table 1, the variable surface distances during focusing, are referenced by the reference signs DD[ ], and the surface numbers on the magnification side at the distances are written into [ ] in the places of D.

Table 2 shows, as an example, an absolute value |fu| of the focal length of the whole system in a case where the distance from the magnification side imaging surface to the lens surface closest to the magnification side is finite, and an absolute value |f| of the focal length of the whole system in a case where the distance from the magnification side imaging surface to the lens surface closest to the magnification side is infinite. Table 2 shows values of the F number FNo., the maximum total angle of view 2ω, and the variable surface distance on the basis of the d line. (°) in the place of 2ω indicates that the unit thereof is a degree. Table 2 shows a case where the enlargement magnification of the whole system is 206.9, as the example in the case where the distance from the magnification side imaging surface to the lens surface closest to the magnification side is finite. Here, the column labeled "β=206.9" shows values in the case where the enlargement magnification is 206.9. In addition, the column labeled "infinity" shows values in the case where the distance from the magnification side imaging surface to the lens surface closest to the magnification side is infinite.

In Table 1, the reference sign * is attached to surface numbers of aspheric surfaces, and the column of the radius of curvature of the aspheric surface shows numerical values of the paraxial radius of curvature. In Table 3, the row of Sn shows surface numbers of the aspheric surfaces, and the rows of KA and Am (m=3, 4, 5, . . . ) shows numerical values of the aspheric surface coefficients for each aspheric surface. The "E±n" (n: an integer) in numerical values of the aspheric surface coefficients of Table 3 indicates "×10$^{±n}$". KA and Am are the aspheric surface coefficients in the aspheric surface expression represented by the following expression.

$$Zd = C \times h^2 / \{1 + (1 - KA \times C^2 \times h^2)^{1/2}\} + \Sigma Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is a paraxial curvature, KA and Am are aspheric surface coefficients, and Σ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Sn | R | D | Nd | νd |
|---|---|---|---|---|
| *1 | −9.6231 | 2.353 | 1.53158 | 55.08 |
| *2 | −14.6494 | 18.151 | | |
| 3 | 29.3157 | 1.388 | 1.83481 | 42.72 |
| 4 | 15.1050 | 4.234 | | |
| 5 | 22.1596 | 0.851 | 1.90366 | 31.31 |
| 6 | 11.1209 | 7.386 | | |
| 7 | −59.7034 | 1.986 | 1.51680 | 64.20 |
| 8 | −30.5005 | 0.675 | | |
| 9 | −23.5865 | 1.856 | 1.67790 | 55.34 |
| 10 | 23.9225 | DD[10] | | |
| 11 | 269.7647 | 7.928 | 1.71736 | 29.52 |
| 12 | −36.0642 | DD[12] | | |
| 13 | 41.8684 | 10.052 | 1.80610 | 33.27 |
| 14 | −57.0989 | DD[14] | | |
| 15 | −879.1901 | 4.733 | 1.67790 | 55.34 |
| 16 | −13.5051 | 0.567 | 1.80518 | 25.42 |
| 17 | 25.6503 | 6.304 | 1.49700 | 81.61 |
| 18 | −23.6332 | 2.400 | | |
| 19 | −8588.0665 | 3.403 | 1.80809 | 22.76 |
| 20 | −66.9352 | 1.977 | | |
| 21 | 47.9774 | 3.929 | 1.59282 | 68.62 |
| 22 | −227.9738 | 50.314 | | |
| *23 | −793.1999 | 4.253 | 1.80625 | 40.91 |
| *24 | −71.4167 | 41.398 | | |
| 25 | 145.3410 | 6.237 | 1.54072 | 47.23 |
| 26 | −25.5094 | 1.135 | 1.80610 | 33.27 |
| 27 | −42.1856 | 35.719 | | |
| 28 | 43.1068 | 0.900 | 1.84666 | 23.78 |
| 29 | 34.8842 | 9.800 | | |
| 30 | −48.3806 | 0.707 | 1.80000 | 29.84 |
| 31 | 37.4608 | 4.213 | 1.49700 | 81.54 |
| 32 | −45.2521 | 0.113 | | |
| 33 | 47.2061 | 7.657 | 1.49700 | 81.61 |
| 34 | −50.5951 | 17.691 | | |
| 35 | 53.5260 | 2.673 | 1.89286 | 20.36 |
| 36 | 554.8675 | 12.786 | | |
| 37 | ∞ | 49.915 | 1.51633 | 64.14 |
| 38 | ∞ | 0.000 | | |

TABLE 2

Example 1

| | β = 206.9 | Infinity |
|---|---|---|
| \|fu\| | 4.45 | — |
| \|f\| | — | 4.46 |
| FNo. | 2.39 | 2.39 |
| 2ω(°) | 131.2 | 131.0 |
| DD[10] | 2.155 | 2.182 |
| DD[12] | 9.372 | 9.239 |
| DD[14] | 23.849 | 23.955 |

TABLE 3

Example 1

| Sn | 1 | 2 |
|---|---|---|
| KA | −3.083659987E−01 | −4.108559260E+00 |
| A3 | 9.155466703E−03 | 8.838385815E−03 |
| A4 | −6.392135081E−04 | −8.031724111E−04 |
| A5 | −2.137330555E−06 | 2.804732660E−05 |
| A6 | 2.800283533E−06 | −1.763200831E−06 |
| A7 | −1.019414890E−07 | 4.134948991E−07 |
| A8 | −4.710968212E−09 | −2.991334290E−08 |
| A9 | 3.370217708E−10 | −1.108292021E−10 |
| A10 | 2.222022239E−12 | 8.966337740E−11 |
| A11 | −5.222399228E−13 | −1.921684539E−12 |
| A12 | 3.809755149E−15 | −1.149939854E−13 |
| A13 | 4.537182764E−16 | 3.929728234E−15 |
| A14 | −6.674942238E−18 | 9.246969889E−17 |
| A15 | −2.260924546E−19 | −4.827038933E−18 |
| A16 | 4.438254031E−21 | 3.471417787E−21 |
| A17 | 6.032229619E−23 | 1.590139756E−21 |
| A18 | −1.414696113E−24 | 9.778044922E−24 |
| A19 | −6.672883011E−27 | −8.801998355E−25 |
| A20 | 1.790687903E−28 | 8.084288032E−27 |

| Sn | 23 | 24 |
|---|---|---|
| KA | 1.000000000E+00 | 1.000000000E+00 |
| A3 | 4.211483997E−19 | −9.859163287E−20 |
| A4 | −6.067090453E−07 | −3.099309164E−06 |
| A5 | 2.048593964E−07 | 2.291297112E−07 |
| A6 | 1.737837721E−07 | −1.361460560E−08 |
| A7 | −4.084711136E−08 | 1.688049062E−08 |
| A8 | 5.138832542E−09 | −3.323078899E−09 |
| A9 | −3.834548980E−10 | 2.792399206E−10 |
| A10 | 1.648329809E−11 | −1.069647680E−11 |
| A11 | −2.936197599E−13 | 1.701687087E−13 |

FIG. 7 shows, in order from the left, aberration diagrams in a case where the enlargement magnification of the imaging optical system of Example 1 is 206.9. In FIG. 7, in order from the left side, spherical aberration, astigmatism, distortion, and lateral chromatic aberration are shown. In the spherical aberration diagram, aberrations at the d line (a wavelength of 587.6 nm (nanometers)), the C line (a wavelength of 656.3 nm (nanometers)), and the F line (a wavelength of 486.1 nm (nanometers)) are respectively indicated by the solid line, the long dashed line, and the short dashed line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line and the F line are respectively indicated by the long dashed line and the short dashed line. In the spherical aberration diagram, FNo. indicates an F number. In the other aberration diagrams, ω indicates a half angle of view.

Symbols, meanings, description methods, and illustration methods of the respective data pieces according to Example 1 are basically the same as those in the following examples unless otherwise noted. Therefore, in the following description, repeated description will be omitted.

EXAMPLE 2

FIG. 2 is a cross-sectional view of a lens configuration and rays of an imaging optical system of Example 3. The imaging optical system of Example 2 consists of, in order from the magnification side to the reduction side: a first optical system G1 that has a positive refractive power; and a second optical system G2 that has a negative refractive power. The first optical system G1 consists of eleven lenses L1a to L1k in order from the magnification side to the reduction side. The second optical system G2 consists of a front group G2A and a rear group G2B in order from the magnification side to the reduction side. The front group G2A consists of three lenses L2a to L2c in order from the magnification side to the reduction side. The rear group G2B consists of four lenses L2d to L2g in order from the magnification side to the reduction side. The aspheric lens included in the first optical system G1 is the lens L1a.

Table 4 shows basic lens data of the imaging optical system of Example 2, Table 5 shows specification and variable surface distances, and Table 6 shows aspheric surface coefficients thereof. Table 5 shows a case where the enlargement magnification is 207.0, as the example in the case where the distance from the magnification side imaging surface to the lens surface closest to the magnification side is finite. FIG. 8 shows aberration diagrams in the case where the enlargement magnification is 207.0.

TABLE 4

Example 2

| Sn | R | D | Nd | νd |
|---|---|---|---|---|
| *1 | −8.9598 | 2.324 | 1.53158 | 55.08 |
| *2 | −15.0710 | 14.747 | | |
| 3 | 28.8372 | 1.134 | 1.90525 | 35.04 |
| 4 | 15.5304 | 3.777 | | |
| 5 | 20.2642 | 0.850 | 1.90366 | 31.31 |
| 6 | 10.7505 | 8.515 | | |
| 7 | −36.0726 | 1.985 | 1.72047 | 34.71 |
| 8 | −27.9411 | 0.552 | | |
| 9 | −23.3687 | 1.517 | 1.69680 | 55.53 |
| 10 | 21.5644 | DD[10] | | |
| 11 | 42.1902 | 6.713 | 1.65412 | 39.68 |
| 12 | −34.5342 | DD[12] | | |
| 13 | 47.8868 | 8.337 | 1.72342 | 37.95 |
| 14 | −46.2036 | DD[14] | | |
| 15 | 120.6363 | 5.335 | 1.65160 | 58.55 |
| 16 | −15.5509 | 1.666 | 1.80518 | 25.46 |
| 17 | 23.2665 | 6.602 | 1.49700 | 81.61 |
| 18 | −24.2261 | 1.361 | | |
| 19 | 50.9414 | 3.414 | 1.71300 | 53.87 |
| 20 | −85.8234 | 42.339 | | |
| *21 | 248.7260 | 2.957 | 1.80625 | 40.91 |
| *22 | −84.9175 | 42.958 | | |
| 23 | 157.7357 | 6.813 | 1.51633 | 64.14 |
| 24 | −23.8075 | 1.513 | 1.72342 | 37.95 |
| 25 | −37.8830 | 50.568 | | |
| 26 | −50.4687 | 2.008 | 1.85026 | 32.27 |
| 27 | 35.4488 | 5.265 | 1.49700 | 81.54 |
| 28 | −41.5404 | 0.529 | | |
| 29 | 45.1503 | 7.064 | 1.49700 | 81.61 |
| 30 | −63.4429 | 14.640 | | |
| 31 | 59.5028 | 2.540 | 1.89286 | 20.36 |
| 32 | 845.1934 | 12.783 | | |
| 33 | ∞ | 49.915 | 1.51633 | 64.14 |
| 34 | ∞ | 0.000 | | |

TABLE 5

Example 2

| | β = 207.0 | Infinity |
|---|---|---|
| \|fu\| | 4.43 | — |
| \|f\| | — | 4.46 |
| FNo. | 2.39 | 2.39 |
| 2ω(°) | 131.4 | 131.2 |
| DD[10] | 2.019 | 2.048 |
| DD[12] | 14.125 | 13.922 |
| DD[14] | 24.053 | 24.227 |

TABLE 6

Example 2

| Sn | 1 | 2 |
|---|---|---|
| KA | −2.724249104E−01 | −3.916831244E+00 |
| A3 | 8.662156848E−03 | 8.082261506E−03 |
| A4 | −5.979883257E−04 | −6.861552452E−04 |
| A5 | −1.193752467E−06 | 1.661746490E−05 |
| A6 | 2.519241919E−06 | −8.840117038E−07 |
| A7 | −9.447788977E−08 | 3.180903675E−07 |
| A8 | −4.015533219E−09 | −2.222228113E−08 |
| A9 | 2.991799232E−10 | −1.968919855E−10 |
| A10 | 1.554833828E−12 | 6.268904090E−11 |
| A11 | −4.473108241E−13 | −7.608651564E−13 |
| A12 | 3.649654114E−15 | −8.345769002E−14 |
| A13 | 3.755704385E−16 | 1.499778307E−15 |
| A14 | −5.784013754E−18 | 7.593000190E−17 |
| A15 | −1.809376883E−19 | −1.752092450E−18 |
| A16 | 3.670309035E−21 | −2.554955682E−20 |
| A17 | 4.667044533E−23 | 4.309396831E−22 |
| A18 | −1.127342159E−24 | 1.652388949E−23 |
| A19 | −4.989861801E−27 | −2.783877114E−25 |
| A20 | 1.379836243E−28 | 2.920444702E−28 |

| Sn | 21 | 22 |
|---|---|---|
| KA | 1.000000000E+00 | 1.000000000E+00 |
| A3 | 7.321832983E−19 | −3.288165826E−19 |
| A4 | −4.674753076E−05 | −3.606675429E−05 |
| A5 | 5.119086825E−06 | 4.738698501E−06 |
| A6 | 5.923076187E−07 | 2.576173454E−07 |
| A7 | −9.956023200E−08 | −3.267137839E−08 |
| A8 | 4.736913686E−09 | −3.326518333E−09 |
| A9 | −2.221343627E−10 | 4.087113163E−10 |
| A10 | 2.141272582E−11 | −6.133622600E−12 |
| A11 | −7.506533160E−13 | −2.508304412E−13 |

EXAMPLE 3

Figure 3:
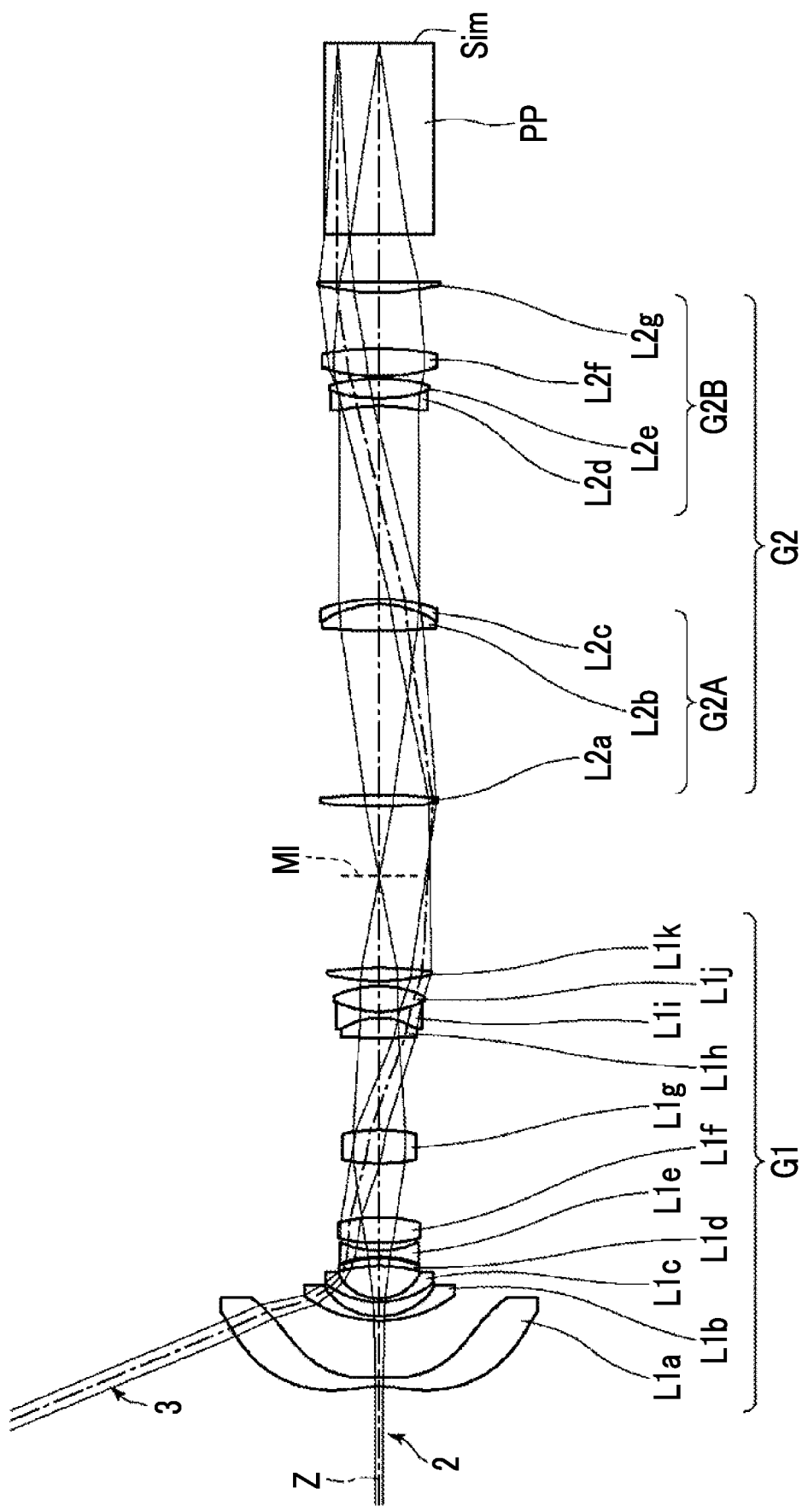
FIG. 3 is a cross-sectional view illustrating a configuration and rays of an imaging optical system according to Example 2 of the present invention.

FIG. 3 is a cross-sectional view of a lens configuration and rays of an imaging optical system of Example 4. The imaging optical system of Example 3 consists of, in order from the magnification side to the reduction side: a first optical system G1 that has a positive refractive power; and a second optical system G2 that has a negative refractive power. The first optical system G1 consists of twelve lenses L1a to L1l in order from the magnification side to the reduction side. The second optical system G2 consists of a front group G2A and a rear group G2B in order from the magnification side to the reduction side. The front group G2A consists of three lenses L2a to L2c in order from the magnification side to the reduction side. The rear group G2B consists of four lenses L2d to L2g in order from the magnification side to the reduction side. The aspheric lenses included in the first optical system G1 are the lens L1a and the lens L1b.

Figure 9:
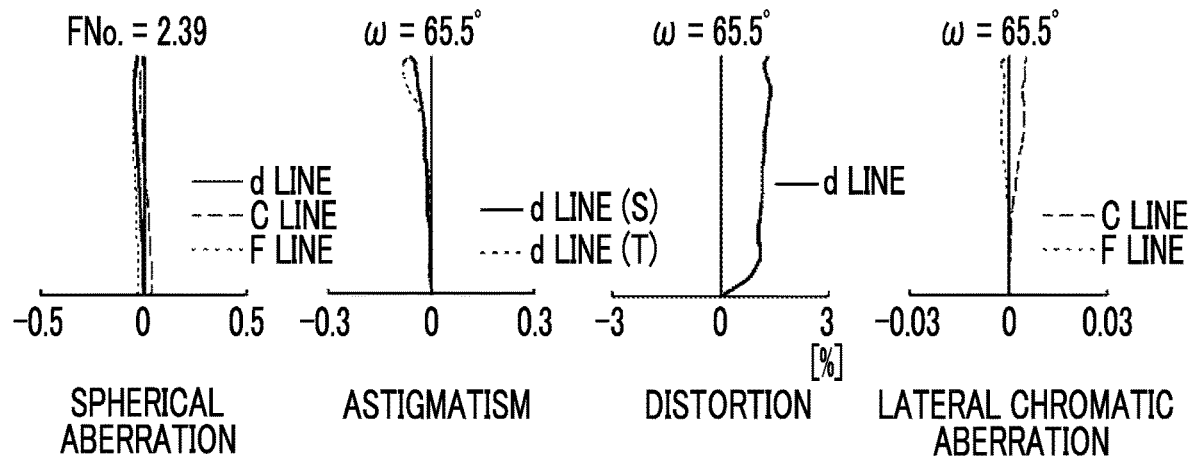
FIG. 9 is a diagram of aberrations of the imaging optical system of Example 3 of the present invention.

Table 7 shows basic lens data of the imaging optical system of Example 3, Table 8 shows specification and variable surface distances, and Table 9 shows aspheric surface coefficients thereof. Table 8 shows a case where the enlargement magnification is 206.9, as the example in the case where the distance from the magnification side imaging surface to the lens surface closest to the magnification side is finite. FIG. 9 shows aberration diagrams in the case where the enlargement magnification is 206.9.

TABLE 7

Example 3

| Sn | R | D | Nd | νd |
|---|---|---|---|---|
| *1 | −10.0994 | 2.700 | 1.53158 | 55.08 |
| *2 | −28.4069 | 5.554 | | |
| *3 | 31.7067 | 1.894 | 1.53158 | 55.08 |
| *4 | 91.3290 | 2.676 | | |
| 5 | 25.3288 | 1.135 | 1.90525 | 35.04 |
| 6 | 13.0526 | 5.997 | | |
| 7 | 22.3760 | 0.860 | 1.90366 | 31.31 |
| 8 | 11.6282 | 7.421 | | |
| 9 | −34.9625 | 3.421 | 1.80518 | 25.46 |
| 10 | −28.4069 | 0.420 | | |
| 11 | −25.2063 | 2.023 | 1.74400 | 44.79 |
| 12 | 22.6892 | DD[12] | | |
| 13 | 71.9150 | 7.496 | 1.67270 | 32.10 |
| 14 | −32.8022 | DD[14] | | |

TABLE 7-continued

Example 3

| Sn | R | D | Nd | νd |
|---|---|---|---|---|
| 32 | −62.5296 | 4.534 | | |
| 33 | 58.8430 | 2.444 | 1.89286 | 20.36 |
| 34 | 1429.2149 | 13.342 | | |
| 35 | ∞ | 49.915 | 1.51633 | 64.14 |
| 36 | ∞ | 0.000 | | |

TABLE 8

Example 3

| | $\beta = 206.9$ | Infinity |
|---|---|---|
| \|fu\| | 4.42 | — |
| \|f\| | — | 4.45 |
| FNo. | 2.39 | 2.39 |
| 2ω(°) | 131.0 | 130.6 |
| DD[12] | 1.697 | 1.745 |
| DD[14] | 13.869 | 13.622 |
| DD[16] | 25.850 | 26.049 |

TABLE 9

Example 3

| Sn | 1 | 2 | 3 | 4 |
|---|---|---|---|---|
| KA | −4.118710275E−01 | −3.817354407E+00 | 9.935260123E−01 | −1.054286711E+01 |
| A3 | 6.836874005E−03 | 6.669162733E−03 | −1.620385719E−03 | −2.520267920E−03 |
| A4 | −4.109223304E−04 | −4.629088389E−04 | −1.529225278E−05 | 2.475147979E−04 |
| A5 | −2.580352493E−06 | 5.349887682E−06 | 9.521796638E−06 | 4.714794862E−06 |
| A6 | 1.383906854E−06 | −4.906317383E−07 | −1.168596988E−08 | −1.000157678E−06 |
| A7 | −3.993381588E−08 | 1.505629429E−07 | −2.551078370E−08 | 8.980484567E−08 |
| A8 | −1.775471962E−09 | −7.790435595E−09 | 1.342666424E−10 | 2.409848958E−09 |
| A9 | 1.049869331E−10 | −9.151464613E−11 | 3.871756327E−11 | −4.270763360E−11 |
| A10 | 6.030269592E−13 | 1.607999766E−11 | −2.759806176E−13 | −3.569070227E−12 |
| A11 | −1.258705613E−13 | −1.651112241E−13 | −3.580800608E−14 | 6.634677372E−14 |
| A12 | 9.226682307E−16 | −1.473715168E−14 | 2.886079082E−16 | 3.351912654E−15 |
| A13 | 8.393405223E−17 | 2.803983688E−16 | 2.052121636E−17 | −5.473236426E−17 |
| A14 | −1.206003154E−18 | 8.830067249E−18 | −1.746844665E−19 | −2.002888448E−18 |
| A15 | −3.197033144E−20 | −2.642248588E−19 | −7.096360770E−21 | 2.551350526E−20 |
| A16 | 6.132412541E−22 | −7.443563797E−22 | 6.175657170E−23 | 7.378239162E−22 |
| A17 | 6.500507867E−24 | 5.405452697E−23 | 1.353537404E−24 | −6.336737692E−24 |
| A18 | −1.501311023E−25 | 7.376905220E−25 | −1.184022377E−26 | −1.527609073E−25 |
| A19 | −5.464761742E−28 | −2.530940450E−26 | −1.091724779E−28 | 6.520511677E−28 |
| A20 | 1.461755983E−29 | 1.546392104E−28 | 9.512773779E−31 | 1.359901390E−29 |

TABLE 7-continued

Example 3

| Sn | R | D | Nd | νd |
|---|---|---|---|---|
| 15 | 44.3215 | 8.508 | 1.71700 | 47.93 |
| 16 | −44.4384 | DD[16] | | |
| 17 | 99.3058 | 6.813 | 1.62041 | 60.29 |
| 18 | −16.1952 | 1.319 | 1.80518 | 25.46 |
| 19 | 22.3046 | 5.782 | 1.49700 | 81.61 |
| 20 | −25.6427 | 1.361 | | |
| 21 | 56.2960 | 4.307 | 1.74320 | 49.34 |
| 22 | −94.1581 | 42.920 | | |
| 23 | 44.1395 | 6.725 | 1.57099 | 50.80 |
| 24 | −83.2513 | 48.181 | | |
| 25 | 230.6899 | 6.812 | 1.51633 | 64.14 |
| 26 | −19.6511 | 1.701 | 1.72047 | 34.71 |
| 27 | −36.3846 | 33.985 | | |
| 28 | −48.8829 | 4.182 | 1.85026 | 32.27 |
| 29 | 39.2875 | 4.675 | 1.49700 | 81.54 |
| 30 | −42.3326 | 0.114 | | |
| 31 | 48.6703 | 7.657 | 1.49700 | 81.61 |

EXAMPLE 4

Figure 4:
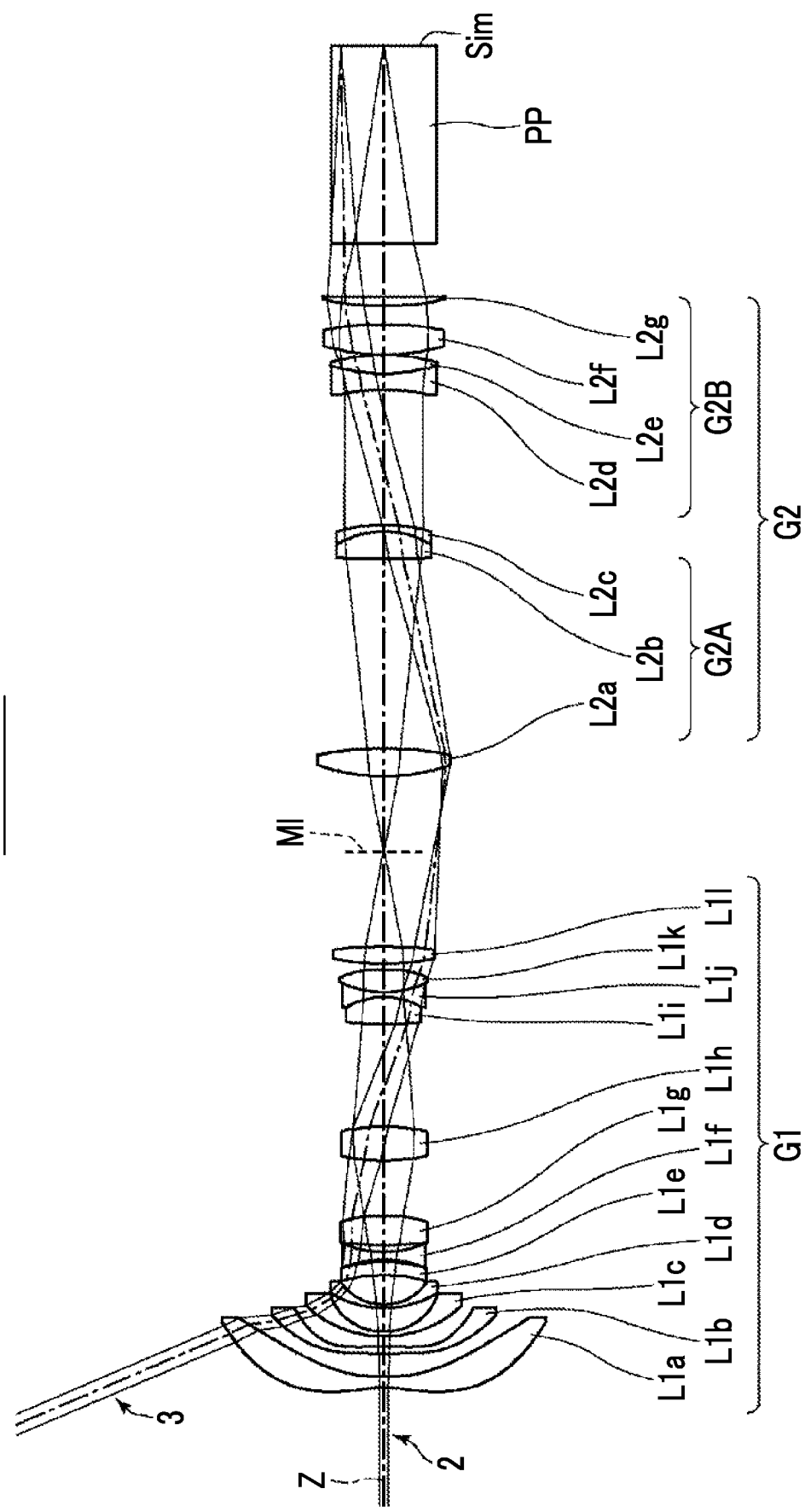
FIG. 4 is a cross-sectional view illustrating a configuration and rays of an imaging optical system according to Example 3 of the present invention.

FIG. 4 is a cross-sectional view of a lens configuration and rays of an imaging optical system of Example 5. The imaging optical system of Example 4 consists of, in order from the magnification side to the reduction side: a first optical system G1 that has a positive refractive power; and a second optical system G2 that has a negative refractive power. The first optical system G1 consists of twelve lenses L1a to L1l in order from the magnification side to the reduction side. The second optical system G2 consists of a front group G2A and a rear group G2B in order from the magnification side to the reduction side. The front group G2A consists of three lenses L2a to L2c in order from the magnification side to the reduction side. The rear group G2B consists of four lenses L2d to L2g in order from the magnification side to the reduction side. The aspheric lenses included in the first optical system G1 are the lens L1a and the lens L1b.

Figure 10:
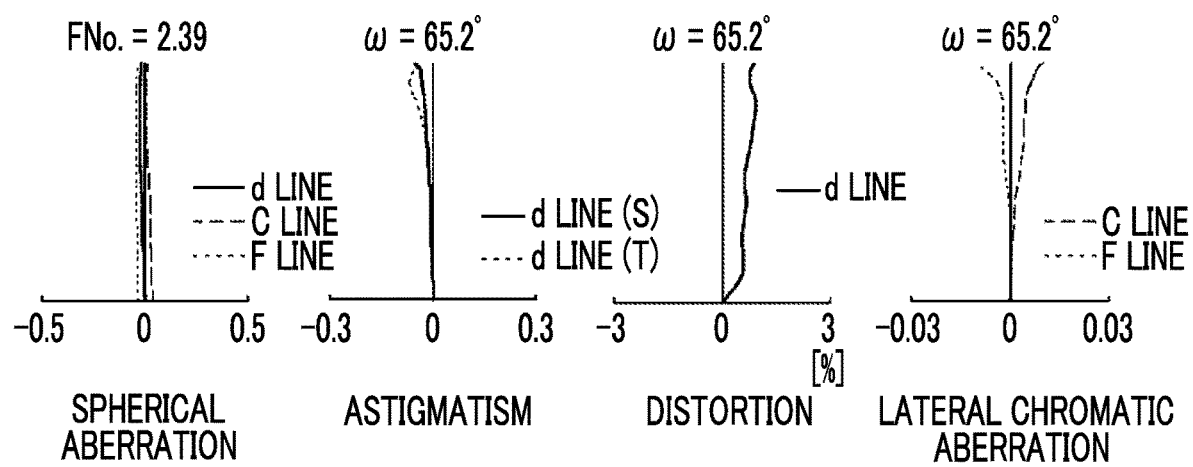
FIG. 10 is a diagram of aberrations of the imaging optical system of Example 4 of the present invention.

Table 10 shows basic lens data of the imaging optical system of Example 4, Table 11 shows specification and variable surface distances, and Table 12 shows aspheric surface coefficients thereof. Table 11 shows a case where the enlargement magnification is 203.6, as the example in the case where the distance from the magnification side imaging surface to the lens surface closest to the magnification side is finite. FIG. 10 shows aberration diagrams in the case where the enlargement magnification is 203.6.

TABLE 10

Example 4

| Sn | R | D | Nd | νd |
|---|---|---|---|---|
| *1 | −9.9226 | 2.561 | 1.53158 | 55.08 |
| *2 | −23.3251 | 5.680 | | |
| *3 | 32.9998 | 2.442 | 1.53158 | 55.08 |
| *4 | 55.5286 | 3.403 | | |
| 5 | 26.6887 | 1.134 | 1.90525 | 35.04 |
| 6 | 13.7016 | 5.627 | | |
| 7 | 21.9306 | 1.514 | 1.90366 | 31.31 |
| 8 | 11.6140 | 7.487 | | |
| 9 | −34.6213 | 2.941 | 1.80518 | 25.46 |
| 10 | −28.6761 | 0.534 | | |
| 11 | −25.5937 | 1.772 | 1.74400 | 44.79 |
| 12 | 23.3926 | DD[12] | | |
| 13 | 63.7235 | 7.229 | 1.67270 | 32.10 |
| 14 | −32.3355 | DD[14] | | |

TABLE 10-continued

Example 4

| Sn | R | D | Nd | νd |
|---|---|---|---|---|
| 32 | −55.2522 | 0.150 | | |
| 33 | 63.0602 | 3.587 | 1.89286 | 20.36 |
| 34 | 6283.7660 | 12.760 | | |
| 35 | ∞ | 49.915 | 1.51633 | 64.14 |
| 36 | ∞ | 0.000 | | |

TABLE 11

Example 11

| | β = 203.6 | Infinity |
|---|---|---|
| \|fu\| | 4.50 | — |
| \|f\| | — | 4.53 |
| FNo. | 2.39 | 2.39 |
| 2ω(°) | 130.4 | 130.2 |
| DD[12] | 1.326 | 1.366 |
| DD[14] | 13.775 | 13.551 |
| DD[16] | 23.863 | 24.047 |

TABLE 12

Example 4

| Sn | 1 | 2 | 3 | 4 |
|---|---|---|---|---|
| KA | −3.801433414E−01 | −4.160402703E+00 | 9.839084915E−01 | 1.416516624E+00 |
| A3 | 7.112400844E−03 | 7.188934392E−03 | −7.535280144E−04 | −1.812429684E−03 |
| A4 | −4.366604776E−04 | −5.192323468E−04 | −1.424177435E−05 | 2.265257895E−04 |
| A5 | −2.646669163E−06 | 6.392872619E−06 | 3.900378831E−06 | 2.220534795E−06 |
| A6 | 1.507464925E−06 | −5.829837249E−07 | 2.089845379E−08 | −1.004943708E−06 |
| A7 | −4.405474393E−08 | 1.840625740E−07 | −8.486141937E−09 | 1.521219978E−08 |
| A8 | −1.992821613E−09 | −9.892154236E−09 | −1.891225711E−11 | 2.637785222E−09 |
| A9 | 1.185829986E−10 | −1.142219181E−10 | 1.018971635E−11 | −5.508961640E−11 |
| A10 | 7.174240770E−13 | 2.175200620E−11 | 1.010838134E−14 | −4.240552471E−12 |
| A11 | −1.459713579E−13 | −2.414942321E−13 | −7.380197047E−15 | 8.275646245E−14 |
| A12 | 1.050120155E−15 | −2.139295099E−14 | −2.226616193E−18 | 4.295507610E−15 |
| A13 | 1.000435274E−16 | 4.297113144E−16 | 3.296325427E−18 | −6.815867569E−17 |
| A14 | −1.429164205E−18 | 1.388086077E−17 | −4.869684725E−22 | −2.748827692E−18 |
| A15 | −3.918625686E−20 | −4.254078796E−19 | −8.859463781E−22 | 3.201580804E−20 |
| A16 | 7.481335780E−22 | −1.608219379E−21 | 3.982138319E−25 | 1.076968563E−21 |
| A17 | 8.196066817E−24 | 9.534378141E−23 | 1.310965954E−25 | −8.044355827E−24 |
| A18 | −1.881861998E−25 | 1.417819382E−24 | −8.463878978E−29 | −2.356455479E−25 |
| A19 | −7.089378466E−28 | −4.532233316E−26 | −8.192194049E−30 | 8.392120484E−28 |
| A20 | 1.881399500E−29 | 2.505015332E−28 | 6.245359343E−33 | 2.204439623E−29 |

TABLE 10-continued

Example 4

| Sn | R | D | Nd | νd |
|---|---|---|---|---|
| 15 | 43.6151 | 8.509 | 1.71700 | 47.93 |
| 16 | −42.4737 | DD[16] | | |
| 17 | 93.5718 | 7.933 | 1.62299 | 58.16 |
| 18 | −15.4036 | 2.797 | 1.80518 | 25.46 |
| 19 | 21.9832 | 4.977 | 1.49700 | 81.61 |
| 20 | −28.9068 | 3.574 | | |
| 21 | 63.3463 | 4.438 | 1.77250 | 49.60 |
| 22 | −89.5368 | 47.341 | | |
| 23 | 45.4377 | 6.807 | 1.67790 | 55.34 |
| 24 | −151.7340 | 50.267 | | |
| 25 | 291.1131 | 5.004 | 1.51633 | 64.14 |
| 26 | −19.2917 | 1.370 | 1.72047 | 34.71 |
| 27 | −39.9355 | 32.502 | | |
| 28 | −50.0452 | 5.523 | 1.85026 | 32.27 |
| 29 | 38.1667 | 5.526 | 1.49700 | 81.54 |
| 30 | −41.5666 | 0.476 | | |
| 31 | 49.7582 | 7.658 | 1.49700 | 81.61 |

EXAMPLE 5

Figure 5:
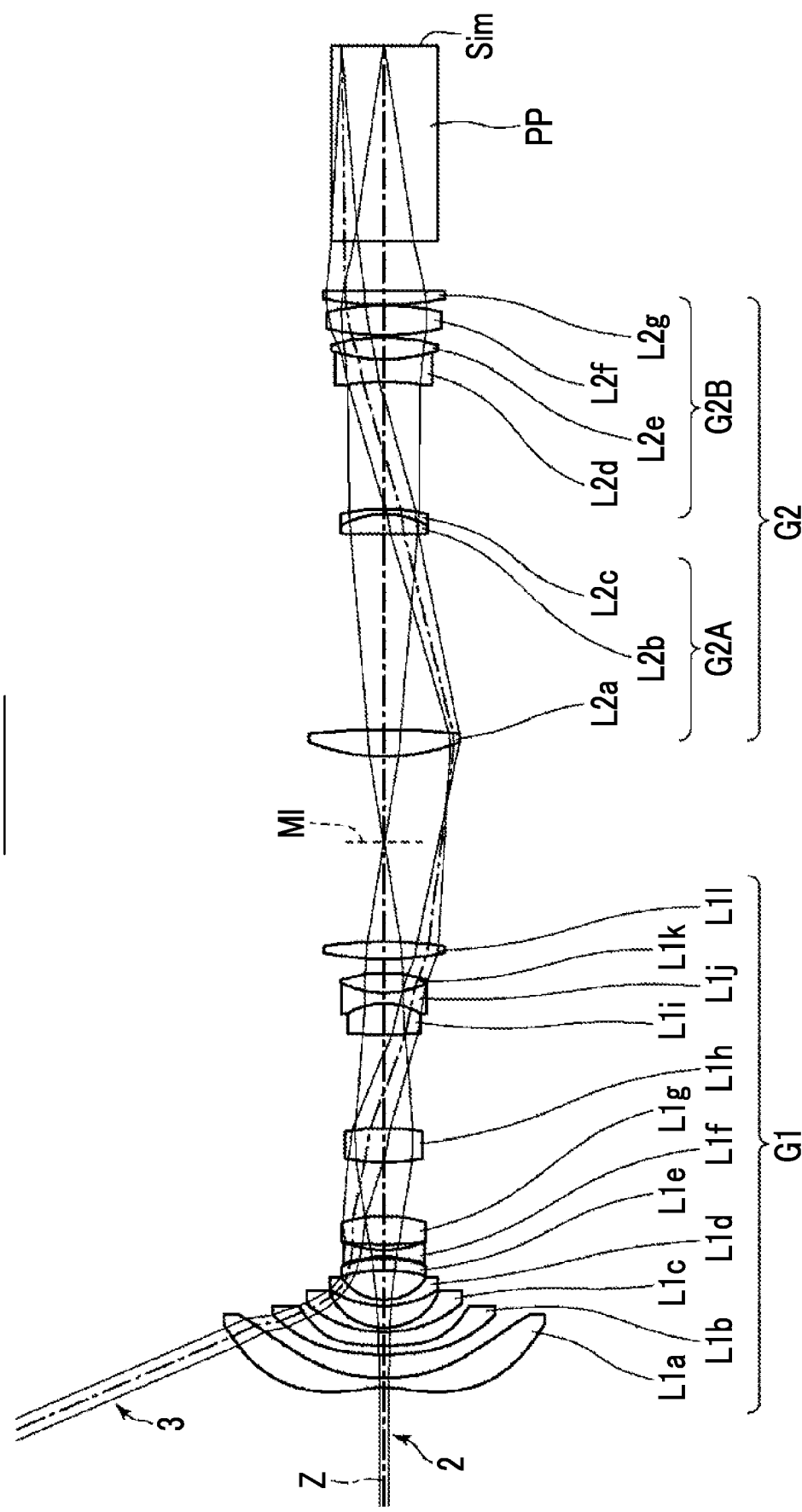
FIG. 5 is a cross-sectional view illustrating a configuration and rays of an imaging optical system according to Example 4 of the present invention.
Figure 6:
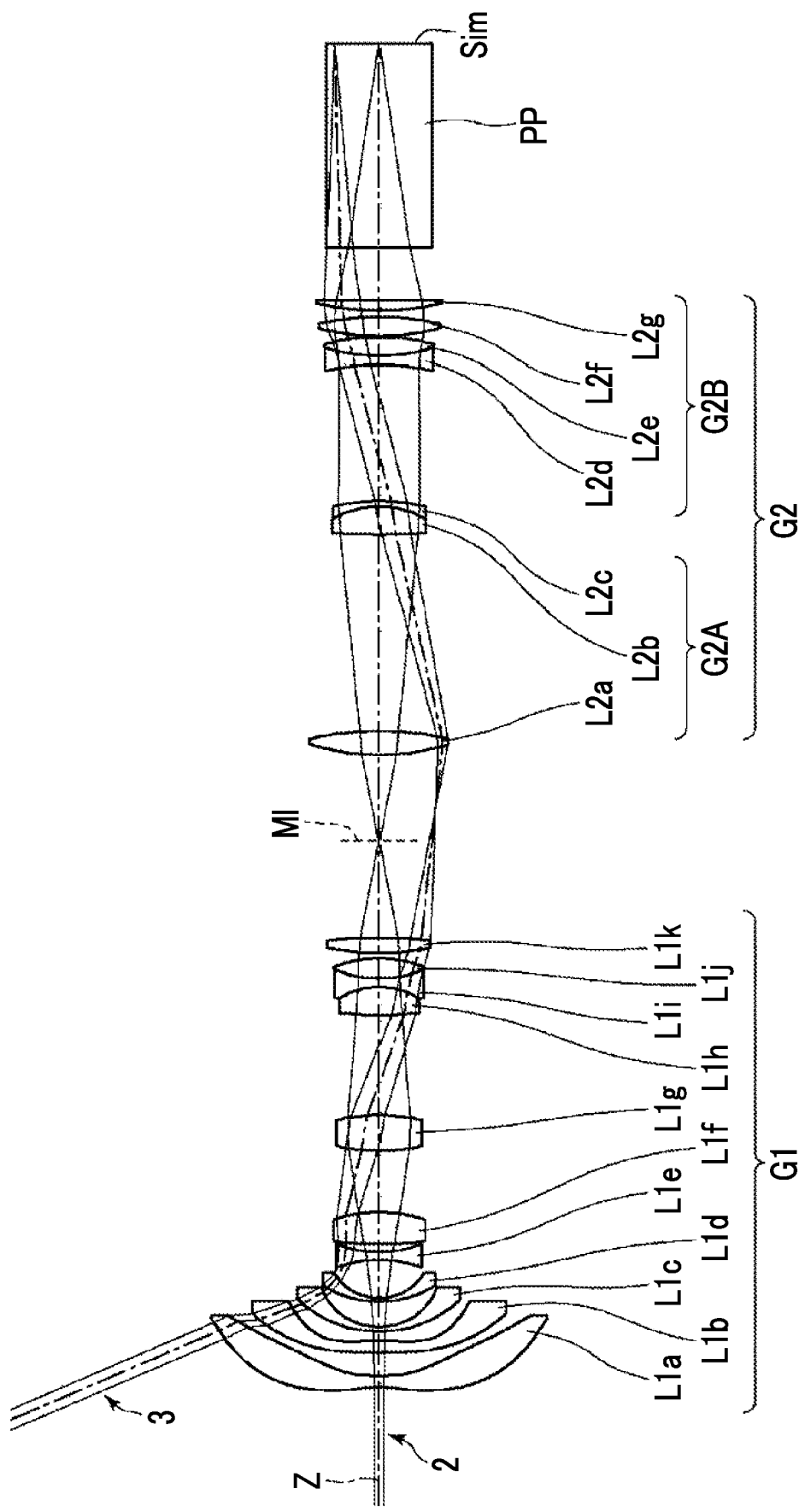
FIG. 6 is a cross-sectional view illustrating a configuration and rays of an imaging optical system according to Example 5 of the present invention.

FIG. 5 is a cross-sectional view of a lens configuration and rays of an imaging optical system of Example 6. The imaging optical system of Example 5 consists of, in order from the magnification side to the reduction side: a first optical system G1 that has a positive refractive power; and a second optical system G2 that has a negative refractive power. The first optical system G1 consists of eleven lenses L1a to L1k in order from the magnification side to the reduction side. The second optical system G2 consists of a front group G2A and a rear group G2B in order from the magnification side to the reduction side. The front group G2A consists of three lenses L2a to L2c in order from the magnification side to the reduction side. The rear group G2B consists of four lenses L2d to L2g in order from the magnification side to the reduction side. The aspheric lenses included in the first optical system G1 are the lens L1a and the lens L1b.

Figure 11:
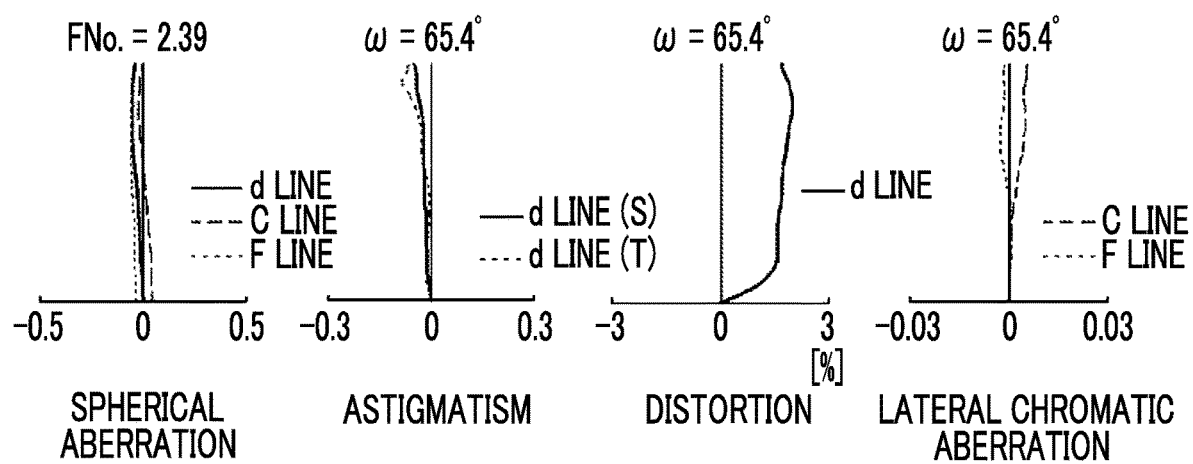
FIG. 11 is a diagram of aberrations of the imaging optical system of Example 5 of the present invention.

Table 13 shows basic lens data of the imaging optical system of Example 5, Table 14 shows specification and variable surface distances, and Table 15 shows aspheric surface coefficients thereof. Table 13 shows a case where the enlargement magnification is 206.8, as the example in the case where the distance from the magnification side imaging surface to the lens surface closest to the magnification side is finite. FIG. 11 shows aberration diagrams in the case where the enlargement magnification is 206.8.

TABLE 13

Example 5

| Sn | R | D | Nd | vd |
|---|---|---|---|---|
| *1 | −10.1848 | 2.674 | 1.53158 | 55.08 |
| *2 | −33.9096 | 5.527 | | |
| *3 | 34.9985 | 2.849 | 1.53158 | 55.08 |
| *4 | 119.4115 | 2.390 | | |
| 5 | 25.3580 | 1.135 | 1.90366 | 31.31 |
| 6 | 13.6032 | 6.181 | | |
| 7 | 22.5643 | 0.851 | 1.80000 | 29.84 |
| 8 | 11.3714 | 9.240 | | |
| 9 | −26.0416 | 1.907 | 1.69680 | 55.53 |
| 10 | 23.1740 | DD[10] | | |
| 11 | 67.8288 | 7.866 | 1.64769 | 33.79 |
| 12 | −28.7346 | DD[12] | | |
| 13 | 43.0280 | 8.292 | 1.66672 | 48.32 |
| 14 | −43.3737 | DD[14] | | |
| 15 | 109.9613 | 6.763 | 1.65160 | 58.55 |
| 16 | −15.7090 | 2.018 | 1.80518 | 25.46 |

TABLE 13-continued

Example 5

| Sn | R | D | Nd | vd |
|---|---|---|---|---|
| 17 | 22.6406 | 4.945 | 1.49700 | 81.61 |
| 18 | −25.9247 | 1.362 | | |
| 19 | 57.3307 | 3.701 | 1.78590 | 44.20 |
| 20 | −107.1132 | 44.525 | | |
| 21 | 48.1672 | 5.781 | 1.58313 | 59.37 |
| 22 | −68.6401 | 48.175 | | |
| 23 | 179.5776 | 6.800 | 1.51680 | 64.20 |
| 24 | −19.6451 | 1.397 | 1.72047 | 34.71 |
| 25 | −38.8077 | 33.091 | | |
| 26 | −49.4705 | 2.058 | 1.85026 | 32.27 |
| 27 | 38.5492 | 4.618 | 1.49700 | 81.54 |
| 28 | −42.5481 | 0.164 | | |
| 29 | 48.8336 | 4.560 | 1.49700 | 81.61 |
| 30 | −60.3899 | 1.658 | | |
| 31 | 57.6892 | 2.417 | 1.89286 | 20.36 |
| 32 | 1495.6299 | 12.751 | | |
| 33 | ∞ | 49.915 | 1.51633 | 64.14 |
| 34 | ∞ | 0.000 | | |

TABLE 14

Example 5

| | $\beta$ = 206.8 | Infinity |
|---|---|---|
| |fu| | 4.43 | — |
| |f| | — | 4.53 |
| FNo. | 2.39 | 2.39 |
| 2ω(°) | 130.8 | 129.6 |
| DD[10] | 1.915 | 2.086 |
| DD[12] | 14.984 | 14.073 |
| DD[14] | 24.548 | 25.289 |

TABLE 15

Example 5

| Sn | 1 | 2 | 3 | 4 |
|---|---|---|---|---|
| KA | −4.075939132E−01 | −3.656026123E+00 | 9.882813396E−01 | −2.311110938E+01 |
| A3 | 6.984922576E−03 | 6.555107615E−03 | −1.384552827E−03 | −2.096906806E−03 |
| A4 | −4.013586781E−04 | −4.160832731E−04 | −1.895250907E−05 | 2.177189817E−04 |
| A5 | −3.381453412E−06 | 7.690279972E−06 | 9.382745492E−06 | 1.599466557E−06 |
| A6 | 1.332296541E−06 | −6.511253427E−07 | −6.770370208E−08 | −6.980126066E−07 |
| A7 | −3.709376522E−08 | 1.133627009E−07 | −2.662675634E−08 | 2.057608328E−08 |
| A8 | −1.666832538E−09 | −6.109229498E−09 | 3.899231224E−10 | 1.321091470E−09 |
| A9 | 9.913840439E−11 | −3.306948571E−12 | 4.199285761E−11 | −6.602569315E−11 |
| A10 | 4.925745026E−13 | 1.172138491E−11 | −7.700671366E−13 | −1.492690184E−12 |
| A11 | −1.189288158E−13 | −2.832075226E−13 | −4.019797891E−14 | 9.375711096E−14 |
| A12 | 9.665214038E−16 | −8.634551076E−15 | 8.119803563E−16 | 1.026049484E−15 |
| A13 | 7.913238434E−17 | 3.872301101E−16 | 2.384519365E−17 | −7.413077710E−17 |
| A14 | −1.193330560E−18 | 3.169293744E−18 | −5.005150476E−19 | −4.215051882E−19 |
| A15 | −3.006399509E−20 | −3.120864042E−19 | −8.542752275E−21 | 3.364759665E−20 |
| A16 | 5.941720574E−22 | 2.045553568E−21 | 1.807262885E−22 | 9.574801106E−23 |
| A17 | 6.099456476E−24 | 7.671616585E−23 | 1.689588246E−24 | −8.197833771E−24 |
| A18 | −1.433388857E−25 | −3.672886353E−25 | −3.543546631E−26 | −9.553390180E−27 |
| A19 | −5.120106107E−28 | −2.434585860E−26 | −1.414015044E−28 | 8.310589686E−28 |
| A20 | 1.378132854E−29 | 2.573754902E−28 | 2.914426163E−30 | 9.766628305E−32 |

Table 16 shows corresponding values and respective numerical values of Conditional Expressions (1) to (8) of the imaging optical systems of Examples 1 to 5. In Examples 1 to 5, the d line is set as the reference wavelength, and Table 16 shows values based on the d line. In the rows of Nas and fas in Table 16, the signs of the corresponding aspheric lenses are written in brackets below the corresponding values. In Table 16, fG2 is a focal length of the second optical system G2, P5-G2B is a distance on the optical axis from the above-mentioned intersection point 5 to the lens surface closest to the magnification side of the rear group G2B, and Bf is a back focal length of the whole system as the air conversion distance.

TABLE 16

| Expression Number | | Example 1 | Example 2 | Example 3 | Example 4 | Example 5 |
|---|---|---|---|---|---|---|
| (1) | fG2A/\|f\| | 13.23 | 12.47 | 12.27 | 12.16 | 11.65 |
| (2) | fG2B/Ymax | 4.61 | 4.61 | 4.34 | 3.95 | 4.33 |
| (3) | \|Ymax/f\| | 2.24 | 2.24 | 2.25 | 2.21 | 2.21 |
| (4) | \|f\|/fG1 | 0.78 | 0.83 | 0.80 | 0.71 | 0.82 |
| (5) | min\|fas × Nas\|/\|f\| | 21.62 | 16.46 | 10.69 | 11.77 | 9.64 |
| (6) | (fG2A/\|f\|) × (Ymax/fG2B) | 2.87 | 2.71 | 2.83 | 3.08 | 2.69 |
| (7) | Nas | 1.53158 (L1a) | 1.53158 (L1a) | 1.53158 (L1a) | 1.53158 (L1a) | 1.53158 (L1a) |
| | | — | — | 1.53158 (L1b) | 1.53158 (L1b) | 1.53158 (L1b) |
| (8) | fG2A/fG2B | 1.28 | 1.21 | 1.26 | 1.39 | 1.22 |

| | Example 1 | Example 2 | Example 3 | Example 4 | Example 5 |
|---|---|---|---|---|---|
| \|f\| | 4.46 | 4.46 | 4.45 | 4.53 | 4.53 |
| fG1 | 5.74 | 5.38 | 5.58 | 6.41 | 5.49 |
| fG2 | 361.62 | −476.05 | −189.64 | −153.40 | −280.94 |
| P5 − G2B | 11.71 | 23.45 | 26.13 | 23.21 | 30.85 |
| fG2A | 59.05 | 55.58 | 54.63 | 55.06 | 52.75 |
| fG2B | 46.15 | 46.07 | 43.44 | 39.50 | 43.33 |
| fas | −63.00 (L1a) | −47.89 (L1a) | −31.07 (L1a) | −34.79 (L1a) | −28.50 (L1a) |
| | — | — | 90.37 (L1b) | 147.46 (L1b) | 92.06 (L1b) |
| Ymax | 10.00 | 10.00 | 10.00 | 10.00 | 10.00 |
| Bf | 45.70 | 45.70 | 46.26 | 45.68 | 45.67 |

As can be seen from the above data, each imaging optical system of Examples 1 to 5 has a small F number of 2.4 or less, has a sufficiently long back focal length ensured, and aberrations are satisfactorily corrected while the telecentricity on the reduction side is maintained. As a result, a high optical performance is achieved.

Figure 12:
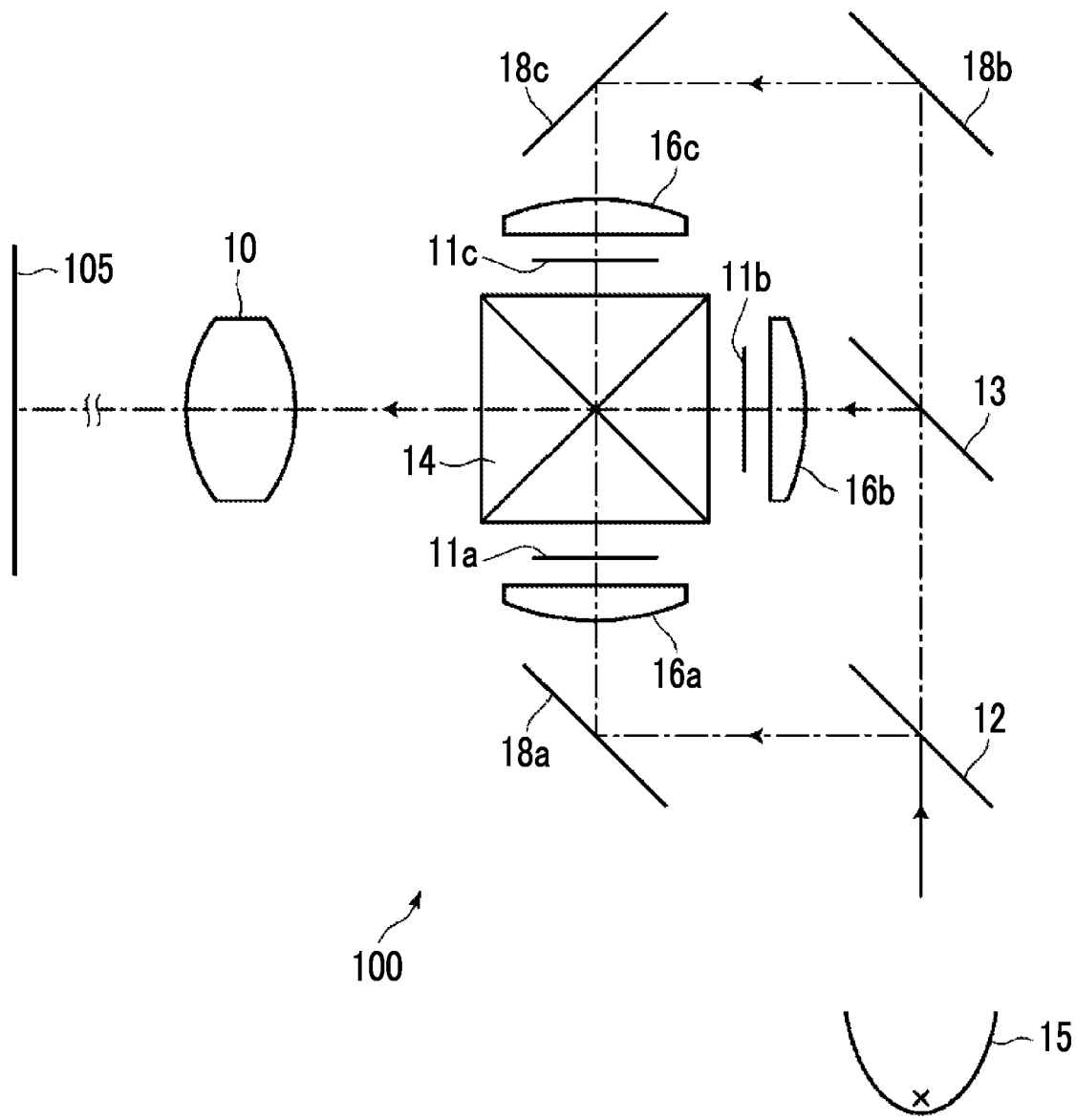
FIG. 12 is a schematic configuration diagram of a projection display device according to an embodiment of the present invention.

Next, a projection display device according to an embodiment of the present invention will be described. FIG. 12 is a schematic configuration diagram of the projection display device according to the above-mentioned embodiment of the present invention. The projection display device 100 shown in FIG. 12 has an imaging optical system 10 according to the embodiment of the present invention, a light source 15, transmissive display elements 11a to 11c as light valves corresponding to respective color light rays, dichroic mirrors 12 and 13 for color separation, a cross dichroic prism 14 for color synthesis, condenser lenses 16a to 16c, and total reflection mirrors 18a to 18c for deflecting the optical path. In FIG. 12, the imaging optical system 10 is schematically illustrated. Further, an integrator is disposed between the light source 15 and the dichroic mirror 12, but illustration thereof is omitted in FIG. 12.

White light originated from the light source 15 is separated into rays with three colors (green light, blue light, red light) through the dichroic mirrors 12 and 13. Thereafter, the rays respectively pass through the condenser lenses 16a to 16c, are incident into and modulated through the transmissive display elements 11a to 11c respectively corresponding to the rays with the respective colors, are subjected to color synthesis through the cross dichroic prism 14, and are subsequently incident into the imaging optical system 10. The imaging optical system 10 projects an optical image, which is formed by the modulated light modulated through the transmissive display elements 11a to 11c, onto a screen 105.

Figure 13:
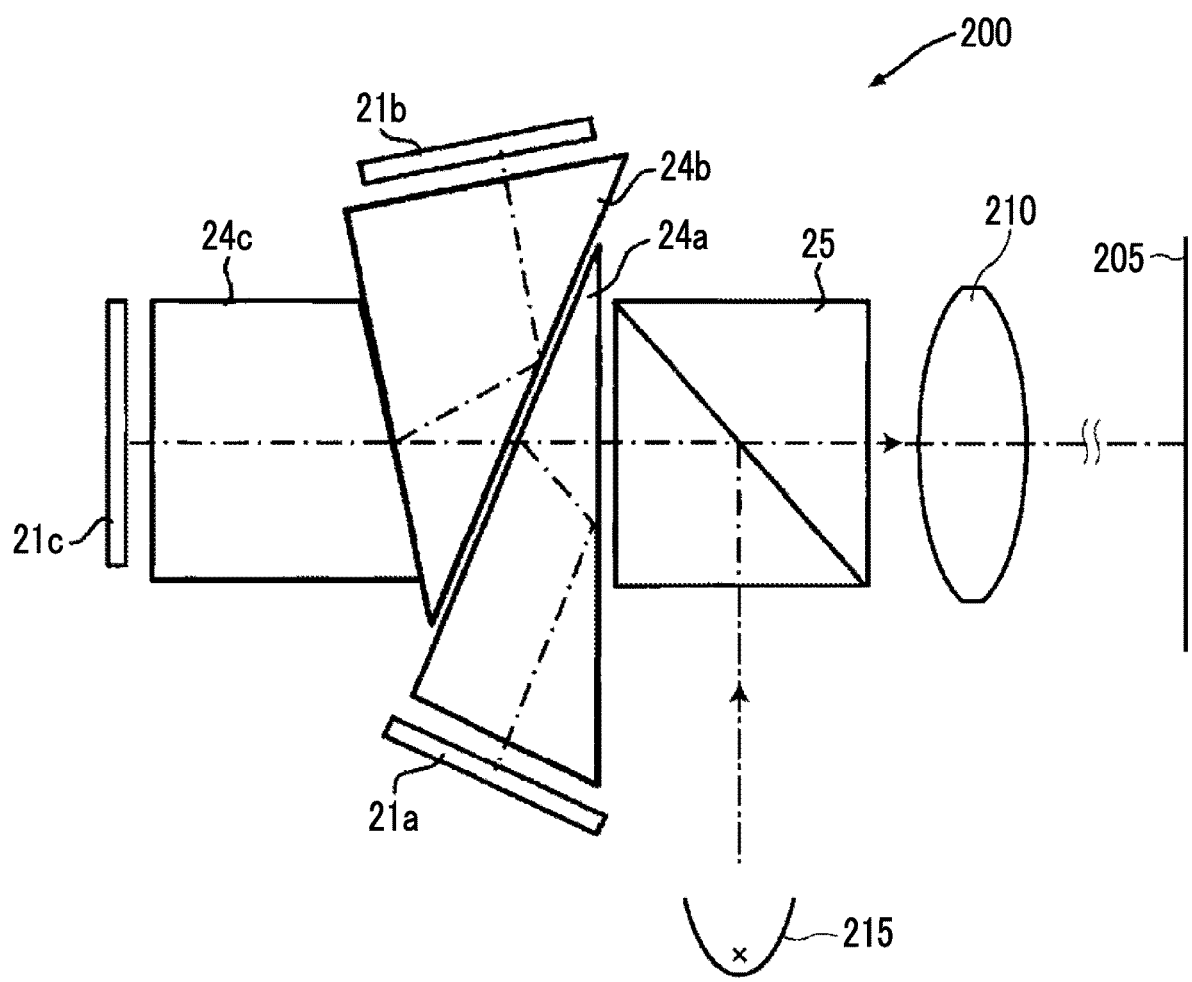
FIG. 13 is a schematic configuration diagram of a projection display device according to another embodiment of the present invention.

FIG. 13 is a schematic configuration diagram of a projection display device according to another embodiment of the present invention. The projection display device 200 shown in FIG. 13 has an imaging optical system 210 according to the embodiment of the present invention, a light source 215, DMD elements 21a to 21c as light valves corresponding to respective color light rays, total internal reflection (TIR) prisms 24a to 24c for color separation and color synthesis, and a polarization separating prism 25 that separates illumination light and projection light. In FIG. 13, the imaging optical system 210 is schematically illustrated. Further, an integrator is disposed between the light source 215 and the polarization separating prism 25, but illustration thereof is omitted in FIG. 13.

White light originated from the light source 215 is reflected on a reflective surface inside the polarization separating prism 25, and is separated into rays with three colors (green light, blue light, red light) through the TIR prisms 24a to 24c. The separated rays with the respective colors are respectively incident into and modulated through the corresponding DMD elements 21a to 21c, travel through the TIR prisms 24a to 24c again in a reverse direction, are subjected to color synthesis, are subsequently transmitted through the polarization separating prism 25, and are incident into the imaging optical system 210. The imaging optical system 210 projects an optical image, which is formed by the modulated light modulated through the DMD elements 21a to 21c, onto a screen 205.

Figure 14:
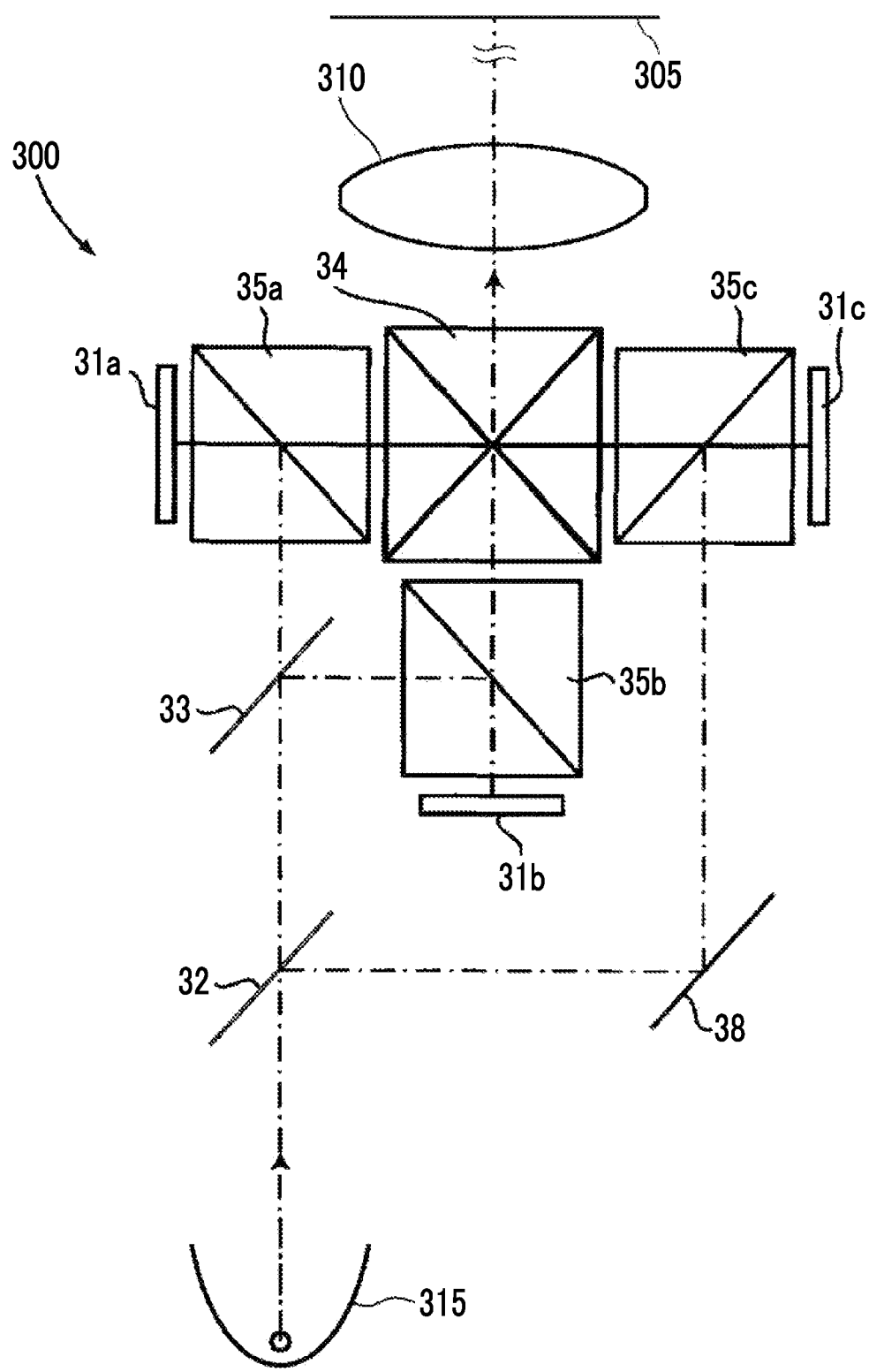
FIG. 14 is a schematic configuration diagram of a projection display device according to still another embodiment of the present invention.

FIG. 14 is a schematic configuration diagram of a projection display device according to still another embodiment of the present invention. The projection display device 300 shown in FIG. 14 has an imaging optical system 310 according to the embodiment of the present invention, a light source 315, reflective display elements 31a to 31c as light valves corresponding to respective color light rays, dichroic mirrors 32 and 33 for color separation, a cross dichroic prism 34 for color synthesis, a total reflection mirror 38 for deflecting the optical path, and polarization separating prisms 35a to 35c. In FIG. 14, the imaging optical system 310 is schematically illustrated. Further, an integrator is disposed between the light source 315 and the dichroic mirror 32, but illustration thereof is omitted in FIG. 14.

White light originated from the light source 315 is separated into rays with three colors (green light, blue light, red light) through the dichroic mirrors 32 and 33. The separated rays with the respective colors respectively pass through the polarization separating prisms 35a to 35c, are incident into and modulated through the reflective display elements 31a to 31c respectively corresponding to the rays with the respective colors, are subjected to color synthesis through the cross dichroic prism 34, and are subsequently incident into the imaging optical system 310. The imaging optical system 310 projects an optical image, which is formed by the modulated light modulated through the reflective display elements 31a to 31c, onto a screen 305.

Figure 15:
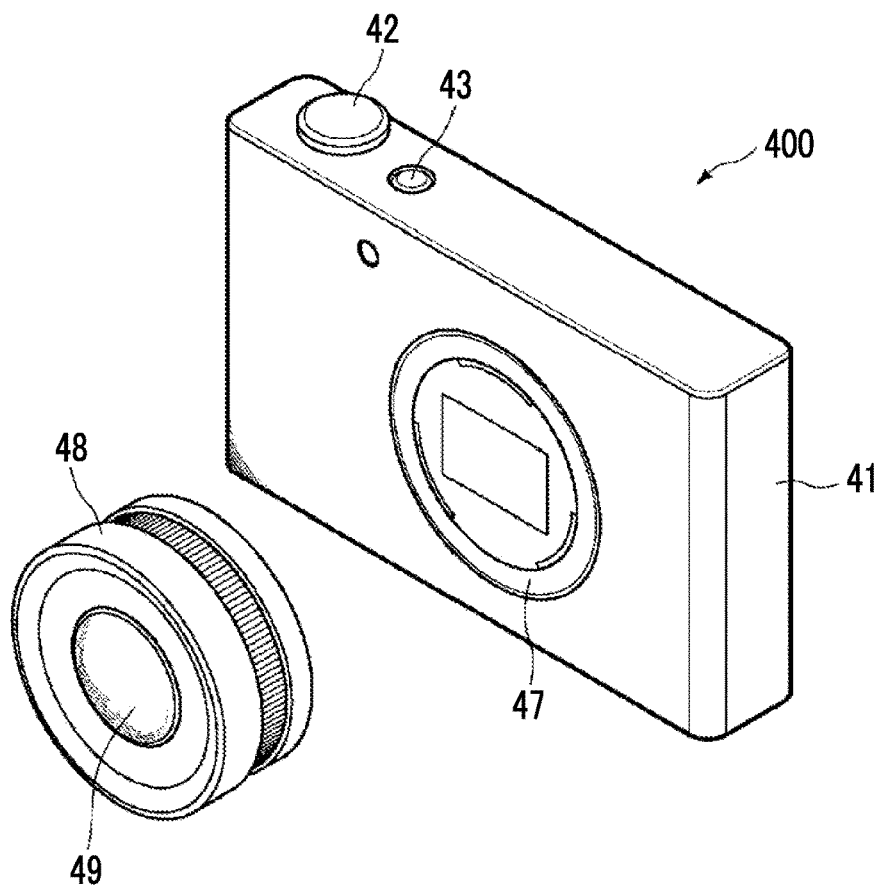
FIG. 15 is a perspective view of the front side of an imaging apparatus according to an embodiment of the present invention.
Figure 16:
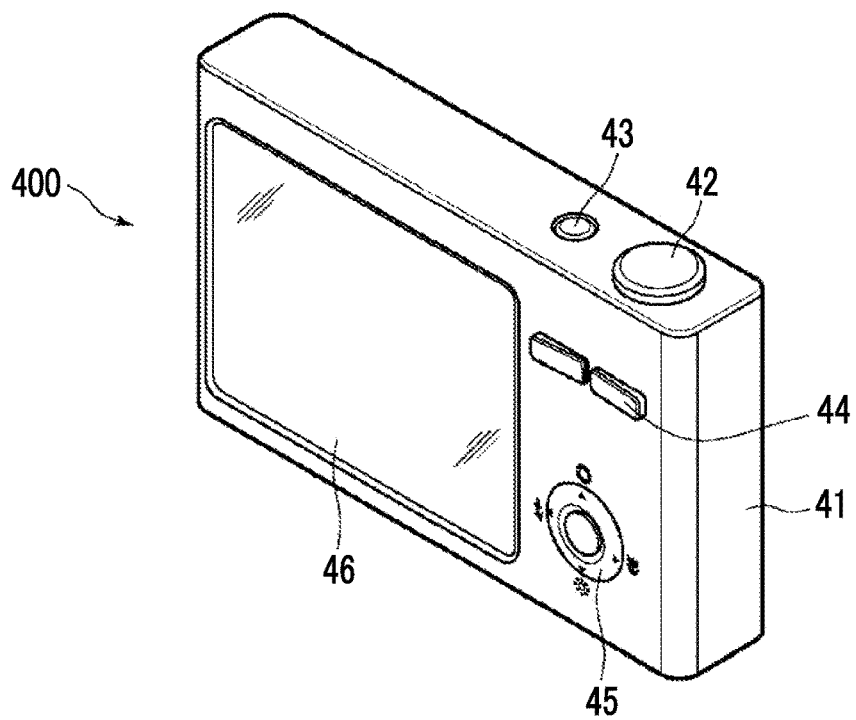
FIG. 16 is a perspective view of the rear side of the imaging apparatus shown in FIG. 15.

FIGS. 15 and 16 are external views of a camera 400 which is the imaging apparatus according to the above-mentioned embodiment of the present invention. FIG. 15 is a perspective view of the camera 400 viewed from the front side, and FIG. 16 is a perspective view of the camera 400 viewed from the rear side. The camera 400 is a single-lens digital camera on which an interchangeable lens 48 is detachably mounted and which has no reflex finder. The interchangeable lens 48 is configured such that the imaging optical system 49 according to the embodiment of the present invention is housed in a lens barrel.

The camera 400 comprises a camera body 41, and a shutter button 42 and a power button 43 are provided on an upper surface of the camera body 41. Further, an operation section 44, an operation section 45, and a display section 46 are provided on a rear surface of the camera body 41. The display section 46 is for displaying a captured image and an image within an angle of view before imaging.

An imaging aperture, through which light from an imaging target is incident, is provided at the center on the front surface of the camera body 41. A mount 47 is provided at a position corresponding to the imaging aperture. The interchangeable lens 48 is mounted on the camera body 41 with the mount 47 interposed therebetween.

In the camera body 41, there are provided an imaging element (not shown in the drawing), a signal processing circuit (not shown in the drawing), a storage medium (not shown in the drawing), and the like. The imaging element such as a charge coupled device (CCD) or a complementary metal oxide semiconductor (CMOS) outputs a captured image signal based on a subject image which is formed through the interchangeable lens 48. The signal processing circuit generates an image through processing of the captured image signal which is output from the imaging element. The storage medium records the generated image. The camera 400 is able to capture a still image or a moving image by pressing the shutter button 42, and is able to store image data, which is obtained through imaging, in the storage medium.

The present invention has been hitherto described through embodiments and examples, but the present invention is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the numerical examples, and different values may be used therefore.

The projection display device of the present invention is also not limited to the above-mentioned configuration, and various modifications of the optical member and the light valve used for the ray separation or the ray synthesis, for example, can be made. The light valve is not limited to an aspect in which light from a light source is spatially modulated by image display elements, and is output as an optical image based on image data, and may have an aspect in which light that is output by self-luminous image display elements is output as an optical image based on image data. Examples of self-luminous image display elements include image display elements in which light emitting elements such as light emitting diodes (LEDs) or organic light emitting diodes (OLEDs) are arrayed two-dimensionally.

Further, the imaging apparatus of the present invention is not limited to the above configuration. For example, the present invention can also be applied to cameras other than the non-reflex cameras, film cameras, video cameras, movie imaging cameras, and the like.

What is claimed is:

1. An imaging optical system consisting of, in order from a magnification side to a reduction side:
    a first optical system which makes a magnification side imaging surface and an intermediate image conjugate to each other; and
    a second optical system which makes the intermediate image and a reduction side imaging surface conjugate to each other,
    wherein the imaging optical system is configured to be telecentric on the reduction side,
    wherein the first optical system includes at least one aspheric lens,
    wherein assuming that a focal length of the imaging optical system is f, a ray, which is incident from the reduction side imaging surface to the second optical system in parallel with an optical axis at a height of |f| from the optical axis, has an intersection point with the optical axis in the second optical system,
    wherein the second optical system consists of, in order from the magnification side to the reduction side, a front group on the magnification side from the intersection point and a rear group on the reduction side from the intersection point, and
    wherein assuming that
        a focal length of the front group is fG2A,
        a focal length of the rear group is fG2B,
        a maximum image height on the reduction side imaging surface is Y max,
        a focal length of the first optical system is fG1,
        a focal length of the aspheric lens included in the first optical system is fas,
        a refractive index of the aspheric lens at the d line is Nas, and
        a minimum value of |fas×Nas| is min|fas×Nas|,
    Conditional Expressions (1), (2), (3), (4), and (5) are satisfied, $$10.5 < fG2A/|f| < 15 \tag{1}$$

$$3 < fG2B/Y\max < 5.5 \tag{2}$$

$$2.1 < |Y\max/f| < 2.7 \tag{3}$$

$$0.65 < |f|/fG1 < 1 \tag{4}$$

$$7.5 < \min|fas \times Nas|/|f| < 23 \tag{5}$$

2. The imaging optical system according to claim 1, wherein Conditional Expression (6) is satisfied, $$2 < (fG2A/|f|) \times (Y\max/fG2B) < 3.5 \tag{6}$$

3. The imaging optical system according to claim 1, wherein Conditional Expression (7) is satisfied for all aspheric lenses included in the first optical system, $$1.45 < Nas < 1.6 \tag{7}$$

4. The imaging optical system according to claim 1, wherein Conditional Expression (8) is satisfied, $$1 < fG2A/fG2B < 1.55 \qquad (8).$$

5. The imaging optical system according to claim 1, wherein a lens closest to the magnification side in the second optical system has a positive refractive power.

6. The imaging optical system according to claim 1, wherein Conditional Expression (1-1) is satisfied, $$11 < fG2A/|f| < 14 \qquad (1\text{-}1).$$

7. The imaging optical system according to claim 1, wherein Conditional Expression (2-1) is satisfied, $$3.5 < fG2B/Y\max < 5 \qquad (2\text{-}1).$$

8. The imaging optical system according to claim 1, wherein Conditional Expression (3-1) is satisfied, $$2.1 < |Y\max/f| < 2.4 \qquad (3\text{-}1).$$

9. The imaging optical system according to claim 1, wherein Conditional Expression (4-1) is satisfied, $$0.7 < |f|/fG1 < 0.9 \qquad (4\text{-}1).$$

10. A projection display device comprising:
a light valve from which an optical image is output based on image data; and
the imaging optical system according to claim 1,
wherein the imaging optical system projects the optical image, which is output from the light valve, onto a screen.

11. An imaging apparatus comprising the imaging optical system according to claim 1.

* * * * *